(12) United States Patent
Serber

(10) Patent No.: US 9,399,415 B2
(45) Date of Patent: *Jul. 26, 2016

(54) SEAT ASSEMBLY WITH MOVABLE SEAT AND BACKREST AND METHOD

(75) Inventor: Hector Serber, San Rafeal, CA (US)

(73) Assignee: AMERICAN ERGONOMICS CORPORATION, Novato, CA (US)

( * ) Notice: Subject to any disclaimer, the term of this patent is extended or adjusted under 35 U.S.C. 154(b) by 1102 days.

This patent is subject to a terminal disclaimer.

(21) Appl. No.: 11/267,068

(22) Filed: Nov. 3, 2005

(65) Prior Publication Data

US 2006/0055214 A1   Mar. 16, 2006

Related U.S. Application Data

(63) Continuation-in-part of application No. 10/836,964, filed on Apr. 30, 2004.

(51) Int. Cl.
| | |
|---|---|
| *B60N 2/42* | (2006.01) |
| *B60N 2/22* | (2006.01) |
| *B60N 2/07* | (2006.01) |
| *B60N 2/18* | (2006.01) |
| *B60N 2/427* | (2006.01) |
| *B60N 3/06* | (2006.01) |

(52) U.S. Cl.
CPC ............... *B60N 2/22* (2013.01); *B60N 2/0745* (2013.01); *B60N 2/181* (2013.01); *B60N 2/1832* (2013.01); *B60N 2/1846* (2013.01); *B60N 2/1853* (2013.01); *B60N 2/42736* (2013.01); *B60N 2/42763* (2013.01); *B60N 3/066* (2013.01)

(58) Field of Classification Search
CPC .... B60N 2/2222; B60N 2/2209; B60N 2/309; B60N 2/3065; B60N 2/242; B60N 2/3011; B60N 2/0745; B64C 11/06

USPC .............. 297/232, 248, 249, 216.1, 320, 322, 297/340–342

See application file for complete search history.

(56) References Cited

U.S. PATENT DOCUMENTS

| | | | | |
|---|---|---|---|---|
| 2,611,420 | A | * 9/1952 | Diehl | ........................ 297/344.14 |
| 2,775,996 | A | * 1/1957 | Millar | .............................. 297/62 |
| 3,357,736 | A | 12/1967 | McCarthy | |
| 4,650,249 | A | 3/1987 | Serber | |
| 5,022,707 | A | 6/1991 | Beauvais et al. | |
| 5,112,109 | A | 5/1992 | Takada et al. | |

(Continued)

FOREIGN PATENT DOCUMENTS

BE                537159           4/1955

*Primary Examiner* — Laurie K Cranmer
(74) *Attorney, Agent, or Firm* — Steven A. Nielsen; NielsenPatents.com

(57) ABSTRACT

A seat assembly (21) for a vehicle including a seat (22), a seat mounting assembly (20) mounting the seat for movement along an upwardly concaved arcuate path, a backrest assembly (25) having a lower backrest portion (18) coupled for motion with the seat and an upper backrest portion (99) mounted in a vertically extending direction. The backrest assembly further includes a recliner frame and mechanism (32, 33). The seat assembly, also including the steps of mounting the seat (22) for spherically guided movement along said path, mounting the backrest proximate the seat. The assembly (21) and method disclosed further employs mounting the seat (22) having a spherical surface (161) and guide track (28) the guide track mated to spherical support surface (162), and may include slider roller elements (27, 142) such that the seat mounting assembly accommodates lateral, diagonal and fore and aft seat motion (35, 163).

23 Claims, 17 Drawing Sheets

(56) References Cited

U.S. PATENT DOCUMENTS

| | | |
|---|---|---|
| 5,244,252 A | 9/1993 | Serber |
| 5,460,427 A | 10/1995 | Serber |
| 5,558,399 A | 9/1996 | Serber |
| 5,735,574 A | 4/1998 | Serber |
| 5,961,073 A | 10/1999 | Wittmann |
| 6,030,043 A | 2/2000 | Habedank |
| 6,106,065 A | 8/2000 | Carroll |
| 6,334,648 B1 | 1/2002 | Girsberger et al. |
| 6,352,309 B1 * | 3/2002 | Beroth ............... 297/354.13 |
| 6,641,214 B2 * | 11/2003 | Veneruso ................ 297/322 |
| 6,682,141 B2 | 1/2004 | Reynolds et al. |
| 6,755,469 B2 | 6/2004 | Akaike et al. |
| 6,913,319 B2 | 7/2005 | Yamaguchi et al. |
| 7,063,386 B2 * | 6/2006 | Dowty ............... B60N 2/62 297/311 |
| 7,523,888 B2 * | 4/2009 | Ferry et al. ............ 244/118.6 |

\* cited by examiner

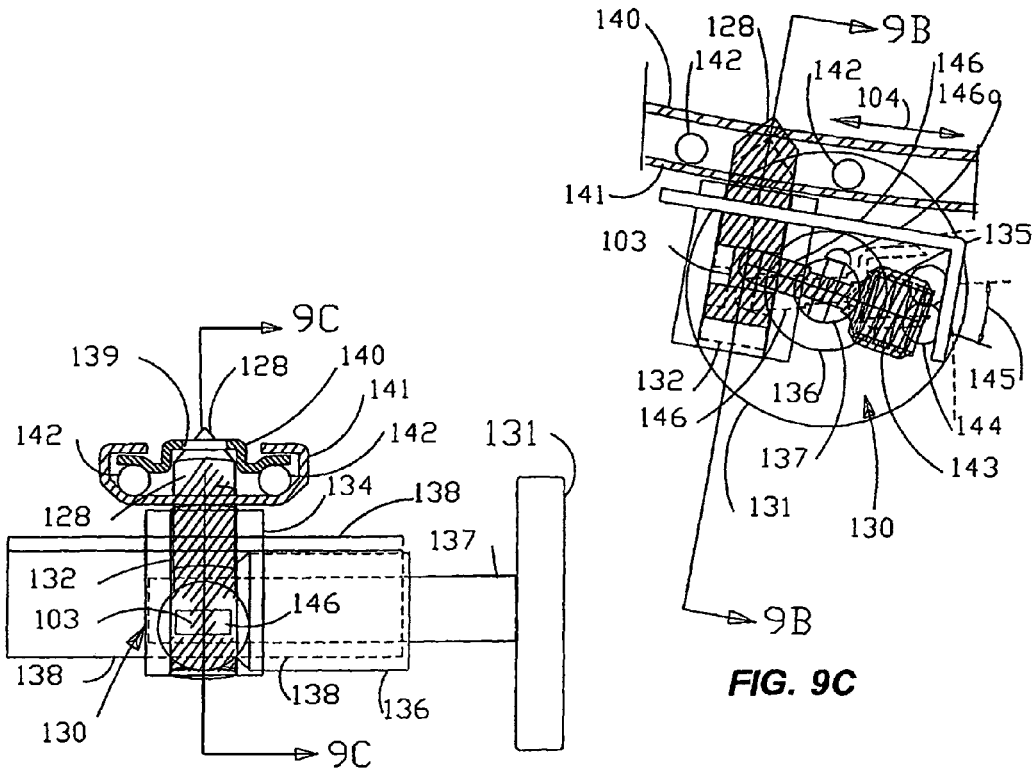
FIG. 9B
FIG. 9C
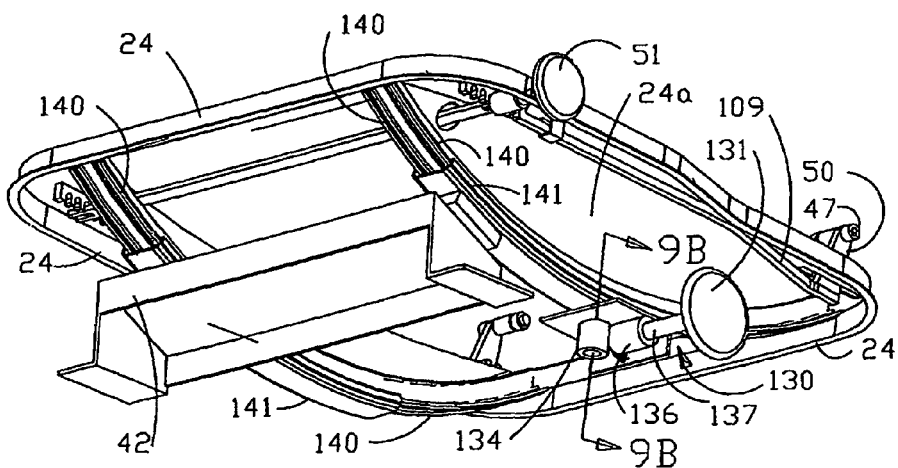
FIG. 9A

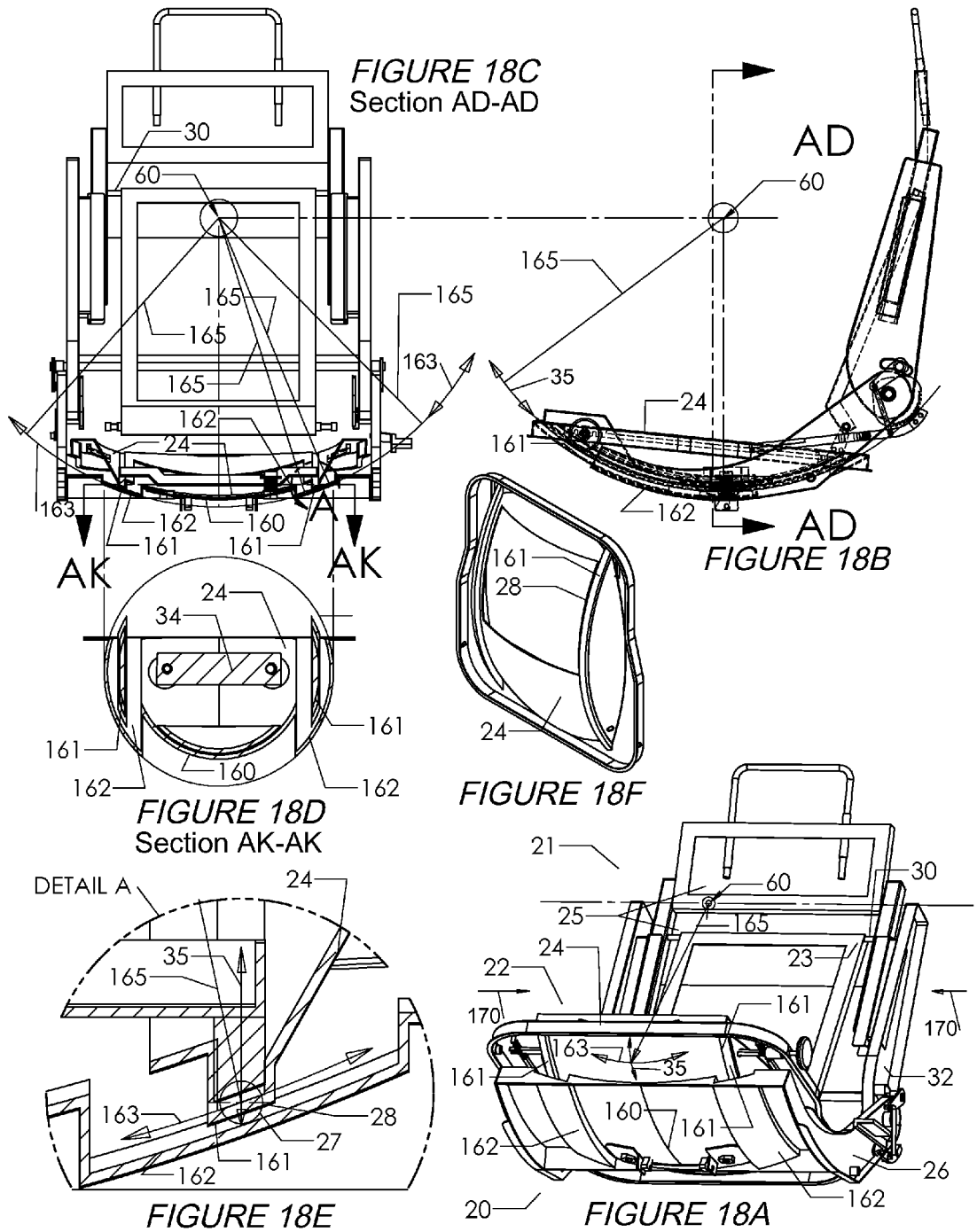

SEAT ASSEMBLY WITH MOVABLE SEAT AND BACKREST AND METHOD

CROSS-REFERENCES TO RELATED APPLICATIONS

This application is a Continuation-in-Part of U.S. patent application Ser. No. 10/836,964 filed Apr. 30, 2004, entitled SEAT ASSEMBLY WITH MOVEABLE SEAT AND BACKREST AND METHOD, the entire contents of which is incorporated herein by this reference.

BACKGROUND OF THE INVENTION

1. Field of the Invention

The present invention relates, in general, to seat assemblies for land, air and water vehicles, as well as stationary seat assemblies, and more particularly, relates to seat assemblies and methods for providing the same in which there is a moveable seat and movable backrest.

2. Description of Related Art

Considerable effort has been directed toward improvement of the safety of seat assemblies which are employed in various types of vehicles and the comfort of seat assemblies which are used in vehicles and in stationary applications. Typical of such effort are the seat assemblies set forth in my U.S. Pat. Nos. 4,650,249; 5,244,252; 5,460,427; 5,558,399 and 5,735,574. Such prior art seat assemblies have sought to improve seating safety and comfort by designing seat motion in a manner controlling body posture and the forces generated in a muscular-skeletal system during rapid vehicle deceleration. Numerous other patents have been directed to the same general goals.

My U.S. Pat. No. 4,650,249, for example, discloses a seat assembly in which the seat is mounted to move along a concave arcuate path having a center of rotation proximate the center of mass of the user. In U.S. Pat. Nos. 5,244,252 and 5,460,427 the movable seat moves away from a lumbar support member and thereby creates a gap in the lower lumbar region that promotes reversing of the lumbar spine. In my U.S. Pat. No. 5,735,574 the lumbar support member has been added which is linked for movement with the seat. The backrest in this patent, however, is fixed, and the lumbar support member moves up and down inside the backrest frame separating the lower part of the backrest between the upper edge of the lumbar and backrest frame. In U.S. Pat. Nos. 5,558,399 and 5,735,574, the FIG. 3 embodiment of these patents includes seat motion which is arcuate in a downward direction, which is undesirable from the safety standpoint.

In addition to my above-noted prior patents U.S. Pat. No. 6,030,043 to Habedank and U.S. Pat. No. 5,961,073 to Whitmann disclose seat assemblies suitable for use in motor vehicles which include movable slots. Thus, the patent to Habedank discloses a seat which is pivoted to the seat base at an adjustable pivot location. The backrest is independently tiltable and also coupled to the seat so that the backrest will be automatically tilted as the seat moves backward and forward, as driven by an electric motor drive. The design is particularly well suited for use in the back seat of an automobile.

The patent to Whitmann, U.S. Pat. No. 5,961,073 discloses a seat assembly for aircrafts in which the bottom seat cushion is guided by rollers in tracks to move forward and upward upon an inertial load. This is combined with a lap belt to limit head excursions on crashes.

The present seat assembly and method include a seat which is mounted for movement along an upwardly concaved arcuate path having a center of rotation proximate the center of mass of the occupant seated on the seat. This type of seat mounting is broadly known and described in my prior patents. In the present invention, however, a backrest is provided which also is linked or coupled for motion that is dependent upon seat motion at the lower end and coupled by an upright slide plane supporting said backrest at the upper end. This linking, produces a self-adjusting effect which realigns the seat assembly in response to changes of body posture by automatically and synchronously seeking equilibrium against the direction of gravitational acceleration and the direction of vehicle longitudinal accelerations. In extreme cases, during frontal or rear impact of a vehicle, the seat provides restraining safety motion to reduce injury.

The backrest frame also can be formed to recline so that the sliding motion of the backrest can be selectively reclined. Moreover, the present seat assembly can work in conjunction with other restraints such as headrests, belts, airbags, lower leg cushions and knee bolsters. Still further the seat assembly of the present invention can be adjusted and controlled to fit different sizes of users in many different postures, such as; an upright or slightly reclined posture for driving; a forward leaning posture for reaching controls or auxiliary equipment; a semi-reclined posture, as may be required in low vehicle cabins; and an extremely reclined seated posture, such as may be employed for sleeping in airliners or the like.

Accordingly, it is an object of the present invention to provide a seat assembly and method which provide enhanced safety and comfort for vehicular and stationary seating application.

Another object of the present invention is to provide a seat assembly and method which provide enhanced safety for vehicle applications in which frontal or rear impacts rebounding accelerations and diagonally offset crashes can cause injurious forces.

A further object of the present invention is to provide a seat assembly and method which can be used to provide enhanced comfort for a wide variety of seating postures.

Another object of the present invention is to provide a seat assembly having improved safety and comfort which is economical to construct, durable and can be employed in a wide range of applications.

The seat assembly and method of the present invention have other objects and features of advantage which will become apparent from, or are set forth in more detail in the accompanying drawings and descriptions of the Best Mode of Carrying out the Invention.

BRIEF SUMMARY OF THE OF INVENTION

In one embodiment, the present invention may be directed to a seat assembly including a seat, a seat mounting assembly mounting the seat in a near horizontal orientation for movement along an upwardly concaved arcuate seat path having one center of curvature proximate the center of mass of a person seated on the seat, and a backrest assembly including a backrest member extending in a near vertical orientation proximate the seat mounting assembly, the backrest member having an upper backrest portion thereof mounted to the backrest assembly for movement in a vertically extending direction and having a lower backrest portion coupled for movement with the seat.

The backrest member may include a backrest frame, an upper frame portion of the backrest frame may be coupled to the backrest assembly for guided vertically extending movement, and a lower frame portion of the backrest frame may be coupled for movement to the seat. The backrest assembly may include a pair of guided channels positioned outwardly of opposite sides of the backrest member. The backrest assembly may include a pair of guide channels positioned inwardly of opposite sides of the backrest member. The backrest frame may be pivotally connected to slider members, the backrest assembly may include a pair of guide channels and, the slider members may be slidably mounted in the guide channels. The backrest assembly may include a recliner frame separate from the backrest frame, the backrest frame being movably mounted to the recliner frame, and a recliner mechanism formed for selective tilting of the recliner frame, the backrest frame and the backrest member rearwardly from a near vertical orientation. The backrest frame may be mounted to the recliner frame by a pair of laterally space apart guide channels and by members movably mounted in the guide channels.

The guide channels may be carried by the recliner frame, and the members movably mounted in the guide channels may be one of: roller members, and slider members carried by the backrest frame. The guide channels may be carried by the backrest frame, and the members movably mounted in the channels may be provided by rollers carried by the recliner frame. The backrest member may be provided by a first backrest member formed and positioned to support the user's lumbar region and a second backrest member mounted above the first backrest member, the second backrest member being formed and positioned to support the user's upper back, and the second backrest member being mounted to an upper portion of the first backrest member for vertical movement therewith.

The seat assembly may include a headrest member carried by one of the first backrest member and the second backrest member for movement therewith, the headrest being formed and positioned for support of the user's head. The backrest member may include a backrest frame movably mounted to a recliner frame provided in the backrest assembly, and the recliner frame may be tiltably mounted to the seat mounting assembly. The seat mounting assembly may include guide tracks carried by one of the seat and a seat support structure, and a plurality of movable members carried by the other of the seat and the seat support structure and formed for movement relative to the guide tracks. The guide tracks may be arcuate and extend over substantially the full fore and aft dimension of the seat. The guide tracks may be arcuate proximate an edge of the seat and may be linear proximate the other edge of the seat. The mounting assembly may include a seat support structure, and the seat may be mounted to the seat support structure by a plurality of link members pivotally coupled at opposite ends to the seat and the seat support structure. The seat mounting assembly may mount the seat for movement along an upwardly concaved spherical path having a center of movement proximate the center of mass of a person seated on the seat. The backrest may be coupled at a lower portion thereof for movement with the seat along the spherical path.

The seat may be coupled to the backrest assembly by a seat-femur length and lumbar depth adjustment assembly. The seat-femur length and lumbar depth adjustment assembly may include a lumbar adjustment member slidably mounted to the seat and coupled to the backrest assembly, and a rotatable adjustment device coupled to displace lumbar adjustment member in a fore-and-aft direction to thereby adjust the distance from the front edge of the seat to the lower portion lumbar region of the backrest frame. The lumbar adjustment member may be a bar having a plurality of teeth formed therein, and, the rotatable adjustment device may be a rotatable axle mounted by bushings to the seat and having at least one slot therein formed to and receiving one of the teeth therein and having a manually engageable knob provided thereon.

The seat mounting assembly may include a seat locking assembly formed for selective locking of the seat in and releasing the locked seat from a desired fore-and-aft position opposite sides of the backrest. The seat locking assembly may include a friction member having a coefficient of friction selected to lock the seat in the desired fore-and-aft position during normal use of the seat and to allow seat arcuate motion in a crash event. The friction member may be provided by a pad, and a spring biasing member may be formed to bias the pad relative to the set mounting assembly toward engagement with a portion of the seat. The seat locking assembly may also include a cam mounted to the seat mounting assembly and formed to urge the pad away from engagement with the seat in opposition to the spring biasing member, and a cam actuator formed and coupled for selective operations by the user of the seat assembly. The cam actuator may be provided by a rotatable mounted rod carrying the cam and having a manually engageable handle thereon.

The seat assembly may also include a safety belt restraining harness anchored in a vehicle with at least one of a lap belt, shoulder belt or middle belt. The shoulder belt may be anchored at one end to a recliner frame carried by the seat mounting assembly. The belt harness may be anchored at one end to a seat mounting assembly in a position below and rearward of the center of mass of a user seated on the seat. The seat mounting assembly may include a height adjustment mechanism formed to selectively raise and lower the height at which the seat may be supported for arcuate movement. The height adjustment mechanism may be provided by an actuator coupled to displace a height adjusting link acting on the seat assembly support structure. The recliner mechanism may include a gear member carried by the recliner frame and having a plurality of teeth formed therein, an arm pivotally mounted to the seat mounting assembly, the arm carrying an interlocking member formed to interengage the teeth to prevent movement relative to the arm, and manually engageable handle mounted on the arm to enable pivoting of the arm to cause the interlocking member to move into and out of engagement with the teeth.

The seat assembly may include a motion controller coupled to the seat and one of the seat mounting assembly and a structure to which the seat may be mounted and formed to apply a force biasing the seat against the weight of the user's torso on the seat. The motion controller may be formed for adjustment of the biasing force applied to the seat. The motion controller may be provided by at least one spring assembly. The motion controller may be a shock absorber. The motion controller may include a piston and cylinder assembly with the pressure in the cylinder being controlled by the user.

The seat mounting assembly may include a backrest biasing spring biasing the backrest member in an upward direction. The seat mounting assembly may include a backrest biasing spring biasing the backrest member in an upward direction. The seat mounting assembly may include a backrest biasing spring biasing the backrest member in an upward direction. The seat mounting assembly may include an inertia locking assembly formed to selectively lock the seat against arcuate motion and release the seat for arcuate motion when a predetermined inertia level has been exceeded. The seat may include at least one arcuate track having spaced pin-receiving structures in a fore-and-aft direction therealong: The inertial locking assembly may include a movable pin dimension for insertion into the openings, and an assembly for selectively moving the pin into and out of the pin-receiving structures. The pin may be resiliently biased into engagement with the pin-receiving structures, and the pin and pin-receiving structures may be cooperatively formed to automatically urge the pin out of the pin-receiving structures when inertia on the seat assembly exceeds a predetermined level. The seat may include an upwardly concaved seat pan with an anti-submarine member extending transversely across the seat.

Another aspect of the present invention may be directed to a seat assembly including a seat, a seat mounting assembly mounting the seat in a near horizontal orientation for movement along an upwardly concaved arcuate seat path having a center of curvature proximate the center of mass of a person seated on the seat, and a backrest assembly including a backrest extending in a near vertical orientation, the backrest including a lower backrest member having a lower lumbar portion coupled for movement to the seat an upper lumbar portion coupled for guided movement to a remainder of the backrest assembly, and an upper backrest member mounted above the lower backrest member, the upper backrest member being movably mounted to the remainder of the backrest assembly and coupled to the lower backrest for movement therewith.

The seat assembly may include a headrest coupled to the upper backrest member for movement therewith. The lower backrest member may be pivotally coupled to the seat and pivotally coupled to the backrest assembly for vertical displacement of the backrest member during arcuate movement of the seat. The seat assembly may also include a pair of vertically extending side bolsters members mounted in a stationary manner to the seat mounting assembly on opposite sides of the backrest member. The seat assembly may include a pair of vertically extending side bolster mounted on opposite sides of one of a recliner frame and a backrest member.

The backrest assembly may include a recliner frame separate from the backrest frame and mounted to the seat mounting assembly for tilting relative thereto, a recliner mechanism formed for selective rearward tilting of the recliner frame, the backrest member being moveable mounted to the recliner frame and being tiltable with the recliner frame. The backrest frame may be mounted to the recliner frame by a pair of vertically extending guide channels and movable members mounted to the channels. The movable members may be one of slider members and roller members. The channels may be carried by one of the backrest frame and the recliner frame, and the movable members may be carried by the other. The guide channels positioned laterally outwardly of the lower backrest member, and the guide channels extend vertically along opposite sides of the lower backrest member. The guide channels may be positioned laterally inwardly of opposite sides of the lower backrest member, and the slider movable members may be mounted to a back of the backrest frame.

The upper backrest member may be coupled for movement relative to the guide channels above the lower backrest member. The lower backrest member may be pivotally coupled to the seat and pivotally coupled to the backrest assembly for vertical displacement during arcuate movement of the seat, and the upper backrest member may be fixed to the recliner frame, and the headrest motion may be coupled to the lower backrest member for movement therewith. The step of using a turning knob or motorized means to cause the movement by selectively rotating the rollers elements around its axis may rotate the seat position.

The belt harness may be coupled to at least one of a buckle, pretensioner, retractor, or load limiter mechanism. The belt harness may be mounted to each side of the seat mounting assembly and at least one of the backrest frame sides. A lap-belt re-route roller loop may be anchored to the seat mounting assembly in a position substantially below, and rearward of the center of mass of the body to change the inclined direction of a lap belt in use, anchored in a vehicle into a substantially vertical direction. The seat and backrest path of motion combined with the spring like action may be formed to provide an arcuate suspension system where the body of the user may be suspended in equilibrium with acceleration forces against the biasing force about the center of rotation of the seat. The seat mounting assembly may mount the seat for movement along an upwardly concaved spherical path having a center of curvature proximate a person's center of mass when seated on the seat.

Another aspect of the present invention is directed to a seat assembly including a seat, and a seat mounting assembly mounting the seat in a near horizontal orientation for movement between a fore and aft direction and a side-to-side direction and diagonally oriented between the two directions The seat mounting assembly may mount the seat for movement along an upwardly concaved spherical path having a center of curvature proximate the center of mass of a person seated on the seat. The seat assembly may include a backrest movably mounted to the seat mounting assembly in a position proximate the seat, the backrest being coupled for movement of a lower portion thereof with movement of the seat and mounted for near vertical reciprocation of an upper portion of the backrest member upon movement of the lower portion with the seat.

Still another aspect of the present invention is directed to a method of providing a seat assembly including the steps of mounting a seat in a near horizontal orientation for movement along an upwardly concaved arcuate path, mounting a backrest in a near vertical orientation proximate the seat for support of the back of a user while seated on the seat, coupling a lower portion of the backrest to the seat for movement of the lower portion of the backrest with movement of the seat, and mounting an upper portion of the backrest for vertically extending movement in response to movement of the lower portion of the backrest.

The method may include the steps of mounting a second backrest above the first-named backrest for movement in a vertically extending direction, the first-named backrest being formed for support of a user's lumbar region and the second backrest being formed for support of the user's upper back, and coupling the second backrest for vertical movement with the first-named backrest member. The step of mounting the backrest may be accomplished by mounting the backrest to a recliner frame having a mechanism formed for selective reclining of the position of the backrest by the user. The step of mounting the backrest may be accomplished by mounting the backrest to a recliner frame formed to support the movement to position the backrest member by the user. The step of mounting the backrest may be accomplished by mounting the backrest for movement to a recliner frame coupled to the backrest by guiding channels and mating sliding-roller elements mounted in the backrest assembly. The movement mounted in a vehicle may be used to reduce injury loads to the user suffered in one of a frontal crash and in a rear-end crash or diagonally offset impact. The may include the step of using the seat assembly to distribute the crash load bearing contribution with at least one of a safety belt restraint, upper body airbags, knee bolsters, lower leg air bag, lower leg bolster cushion and headrest.

Another aspect of the present invention may be directed to a seat assembly for a vehicle having a brake pedal and an accelerator pedal, the seat assembly including a seat adjacent the brake and accelerator pedals, and a foot restraint assembly located proximate the brake and accelerator pedals, the foot restraint assembly being dimensioned and configured to prevent a driver's feet from sliding under the brake and accelerator pedals during a collision. An upper surface of the foot restraint assembly may be substantially planar with the upper surfaces of at least one of the brake and accelerator pedals. The foot restraint assembly may be L-shaped having a side leg extending along a side edge of at least one of the brake and accelerator pedals and a lower leg extending along a lower edge of at least one the brake and accelerator pedals.

The seat may include a seat mounting assembly mounting the seat in a near horizontal orientation for movement along an upwardly concaved arcuate seat path having one center of curvature proximate the center of mass of a person seated on the seat, the seat including an upwardly concaved seat pan with an anti-submarine member extending transversely across the seat, and a backrest assembly including a backrest member extending in a near vertical orientation proximate the seat mounting assembly, the backrest member having an upper backrest portion thereof mounted to the backrest assembly for movement in a vertically extending direction and having a lower backrest portion coupled for movement with the seat.

The seat mounting assembly may include guide tracks carried by one of the seat and a seat support structure, and a plurality of movable members carried by the other of the seat and the seat support structure and formed for movement relative to the guide tracks, wherein the guide tracks may be arcuate and extend over substantially the full fore and aft dimension of the seat, wherein the seat mounting assembly may include a seat support structure, and the seat may be mounted to the seat support structure by a plurality of link members coupled at opposite ends to the seat and the seat support structure, and wherein the seat may be mounted to the seat support structure only by the plurality of link members.

Yet another aspect of the present invention is directed to a seat assembly including a seat, a seat mounting assembly mounting the seat in a near horizontal orientation for movement along an upwardly concaved arcuate seat path having one center of curvature proximate the center of mass of a person seated on the seat, the seat including an upwardly concaved seat pan with an anti-submarine member extending transversely across the seat, and a backrest assembly including a backrest member extending in a near vertical orientation proximate the seat mounting assembly, the backrest member having an upper backrest portion thereof mounted to the backrest assembly for movement in a vertically extending direction and having a lower backrest portion coupled for movement with the seat, wherein the anti-submarine member may be dimensioned and configured to deform and absorb impact energy in response to a predetermined force of impact exerted on the anti-submarine member by the buttocks of a person seated on the seat during collision to decelerate the mass of the person.

The backrest member may include a backrest frame, an upper frame portion of the backrest frame may be coupled to the backrest assembly for guided vertically extending movement, and a lower frame portion of the backrest frame may be coupled for movement to the seat. The backrest assembly may include a pair of guide channels positioned inwardly of opposite sides of the backrest member. The backrest member may be provided by a first backrest member formed and positioned to support the user's lumbar region and a second backrest member mounted above the first backrest member, the second backrest member being formed and positioned to support the user's upper back, and the second backrest member being mounted to an upper portion of the first backrest member for vertical movement therewith.

The seat mounting assembly may include guide tracks carried by one of the seat and a seat support structure, and a plurality of movable members carried by the other of the seat and the seat support structure and formed for movement relative to the guide tracks. The guide tracks may be arcuate and extend over substantially the full fore and aft dimension of the seat. The seat mounting assembly may include a seat support structure, and the seat may be mounted to the seat support structure by a plurality of link members coupled at opposite ends to the seat and the seat support structure. The seat may be mounted to the seat support structure only by the plurality of link members.

Still another aspect of the present invention is directed to a seat assembly including a seat, a seat mounting assembly mounting the seat in a near horizontal orientation for movement along an upwardly concaved arcuate seat path having one center of curvature proximate the center of mass of a person seated on the seat, and a backrest assembly including a backrest member extending in a near vertical orientation proximate the seat mounting assembly, the backrest member having an upper backrest portion thereof mounted to the backrest assembly for movement in a vertically extending direction and having a lower backrest portion coupled for movement with the seat, wherein the seat mounting assembly may include a seat support structure, and the seat may be mounted to the seat support structure at opposite ends to the seat and the seat support structure. The seat may be mounted to the seat support structure by a plurality of link members. The seat may be mounted to the seat support structure only by the plurality of link members.

The backrest member may include a backrest frame, an upper frame portion of the backrest frame may be coupled to the backrest assembly for guided vertically extending movement, and a lower frame portion of the backrest frame may be coupled for movement to the seat. The backrest member may be provided by a first backrest member formed and positioned to support the user's lumbar region and a second backrest member mounted above the first backrest member, the second backrest member being formed and positioned to support the user's upper back, and the second backrest member being mounted to an upper portion of the first backrest member for vertical movement therewith. The seat may include an upwardly concaved seat pan with an anti-submarine member extending transversely across the seat.

A further aspect of the present invention is directed to a vehicular seat assembly including a plurality of seats, a plurality of seat mounting assemblies mounting the respective seats in a near horizontal orientation for movement along respective upwardly concaved arcuate seat paths having one center of curvature adjacent a predetermined center of mass zone, a plurality of backrest assemblies, each including a backrest member extending in a near vertical orientation proximate a respective seat mounting assembly, each backrest member having an upper backrest portion thereof mounted to the respective backrest assembly for movement in a vertically extending direction and each backrest member having a lower backrest portion coupled for movement with the respective seat, and a seat assembly frame for mounting the plurality of seat mounting assemblies and the plurality of backrest assemblies to a vehicle.

The seat assembly frame may be configured and dimensioned to mount the vehicular seat assembly in an aircraft cabin. Each backrest assembly may include a recliner frame separate from the respective backrest frame, each backrest frame being movably mounted to the respective recliner frame, and a recliner mechanism formed for selective tilting of the respective recliner frame, backrest frame and backrest member rearwardly from a near vertical orientation. Each backrest member may include a backrest frame, an upper frame portion of the backrest frame may be coupled to the respective backrest assembly for guided vertically extending movement, and a lower frame portion of the backrest frame may be coupled for movement to the respective seat. Each backrest assembly may include a pair of guide channels positioned inwardly of opposite sides of the respective backrest member. Each backrest frame may be pivotally connected to slider members, each backrest assembly may include a pair of guide channels, and the slider members may be slidably mounted in the guide channels.

BRIEF DESCRIPTION OF THE DRAWING

FIG. 9A is a bottom pictorial view corresponding to FIG. 5 and illustrating a seat motion detent assembly and formed curved mating tracks.

FIG. 9B is an enlarged, front elevation, cross sectional view taken substantially along the plane of line 9B-9B in FIG. 9A FIG. 9C is an enlarged, fragmentary, side elevation view taken substantially along the plane of line 9C-9C in FIG. 9B

FIG. 18A thought 18E are expanded views of FIG. 11 further illustrating certain spherical components of a disclosed embodiment. The description and numbering of components and functions are described in the detailed description of FIG. 11.

FIG. 18B is a side view of FIG. 18A.

FIG. 18C is a front elevation view with a cut section along AD shown in FIG. 18B.

FIG. 18D is a top section along AK shown in FIG. 18C. 18D shows the spherically sliding surfaces which provided the upwardly arcuate path of motion in lateral, diagonal and fore and aft directions.

FIG. 18E depicts a section of area A shown in FIG. 18C showing the detail of the spherical sliding surfaces and the spherical guide tracks mated to sliding support surfaces 27 and 28.

FIG. 18F depicts a perspective view of the seat pan having a spherical surface.

DETAILED DESCRIPTION OF THE INVENTION

Reference will now be made in detail to the preferred embodiments of the invention, examples of which are illustrated in the accompanying drawings. While the invention will be described in conjunction with the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention, as defined by the appended claims.

Figure 1:
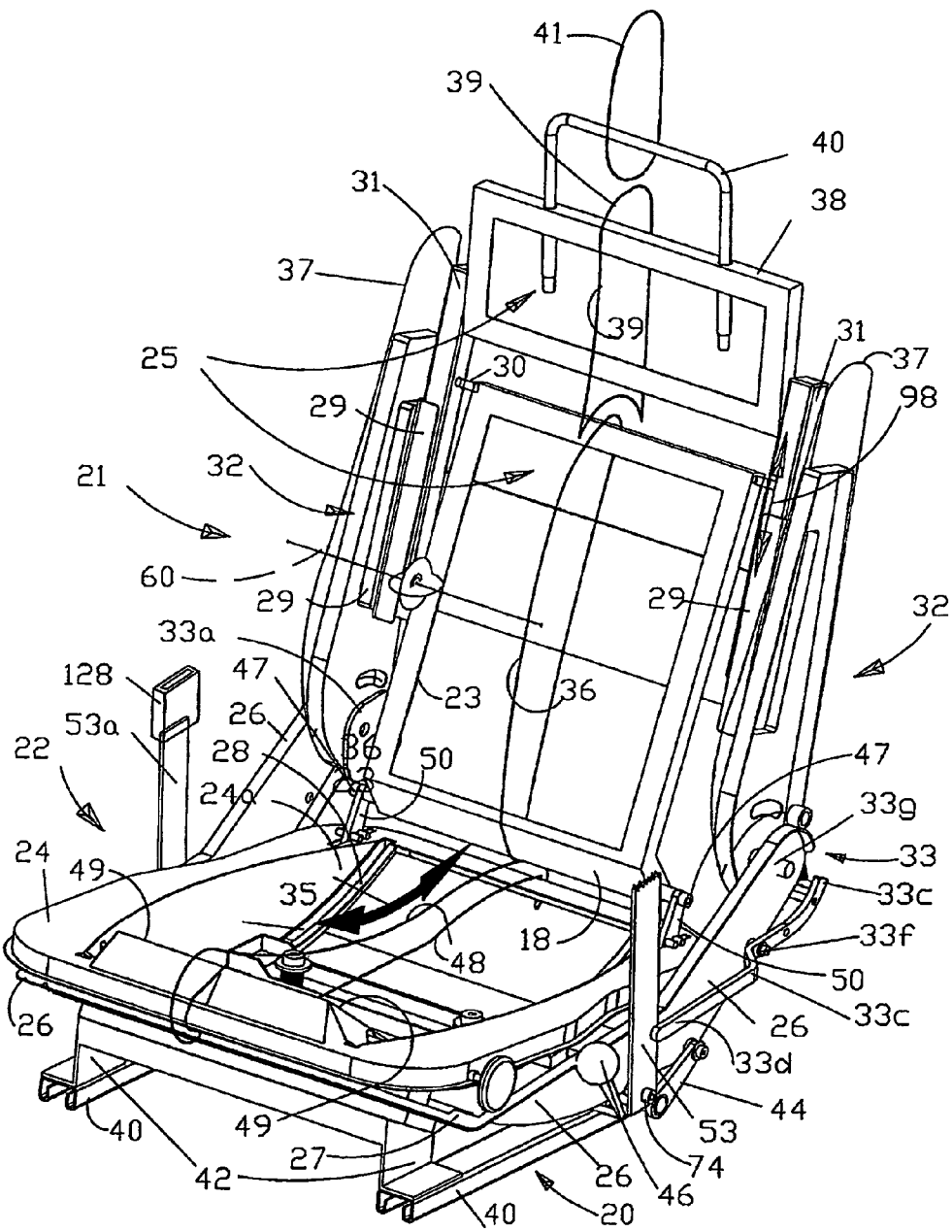
FIG. 1 is a top pictorial view of a seat assembly constructed in accordance with the present invention and having a movable seat and two connected, movable backrest members and a movable headrest.
Figure 2:
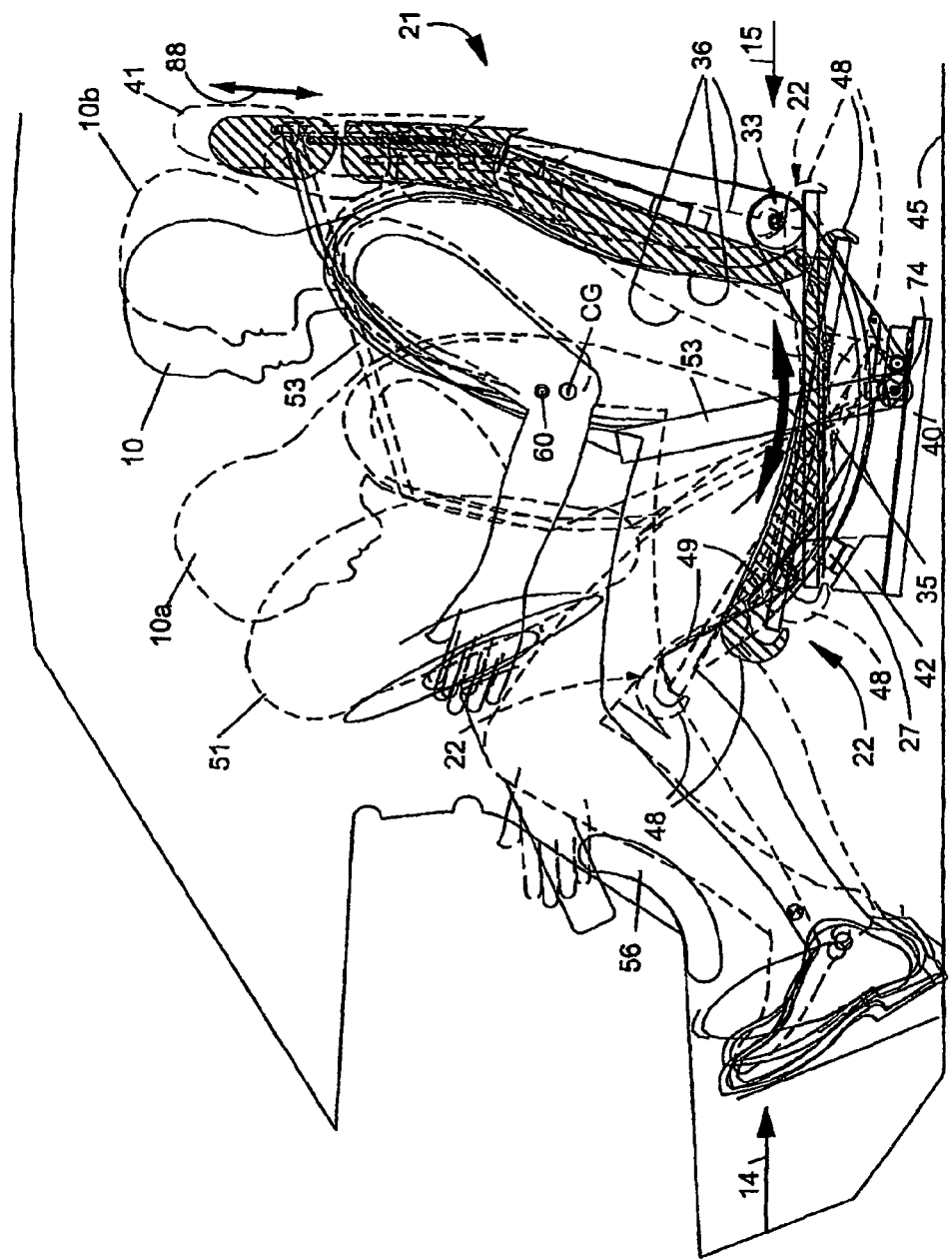
FIG. 2 is a side elevation view of the seat assembly of FIG. 1 mounted in a vehicle with a person seated on the seat and shown in three positions of the range of motion of the seat and backrest assembly in conjunction with other vehicle restraints.

Referring now to FIG. 1 the seat assembly of the present invention, generally designated 21, is shown in which a seat, generally designated 22, is mounted by a seat mounting assembly, generally designated 20, in a near horizontal orientation for movement along an upwardly concaved, arcuate seat path having at lease one center of curvature proximate the center of mass of a person mounted on seat 22. Arrows 35 in FIGS. 1 and 2 illustrates the upwardly concaved arcuate path of seat motion and center line 60 in FIGS. 1 and 2 shows the center of curvature of path 35 to be located proximate a center of gravity, CG, or center of mass of the person seated on the seat (FIG. 2). Construction of mounting assembly 20 to provide for movement of seat 22 along path 35 is not regarded, per se, as being novel, since such movement is clearly disclosed in my above-referenced United States patents, which are incorporated herein by reference. FIG. 2 also shows a lower leg bolster cushion 57 that can take the form of an airbag to contribute load bearing upon collision in a vehicle, and restraining belt anchor point 74 that can be anchored to the seat mounting assembly in a position substantially below, and rearward of the center of mass of the body to change the inclined direction of a lap belt in use during a crash. Anchor 74 can take the form of a lap-belt re-route roller loop when the belt is anchored on the floor.

Figure 4:
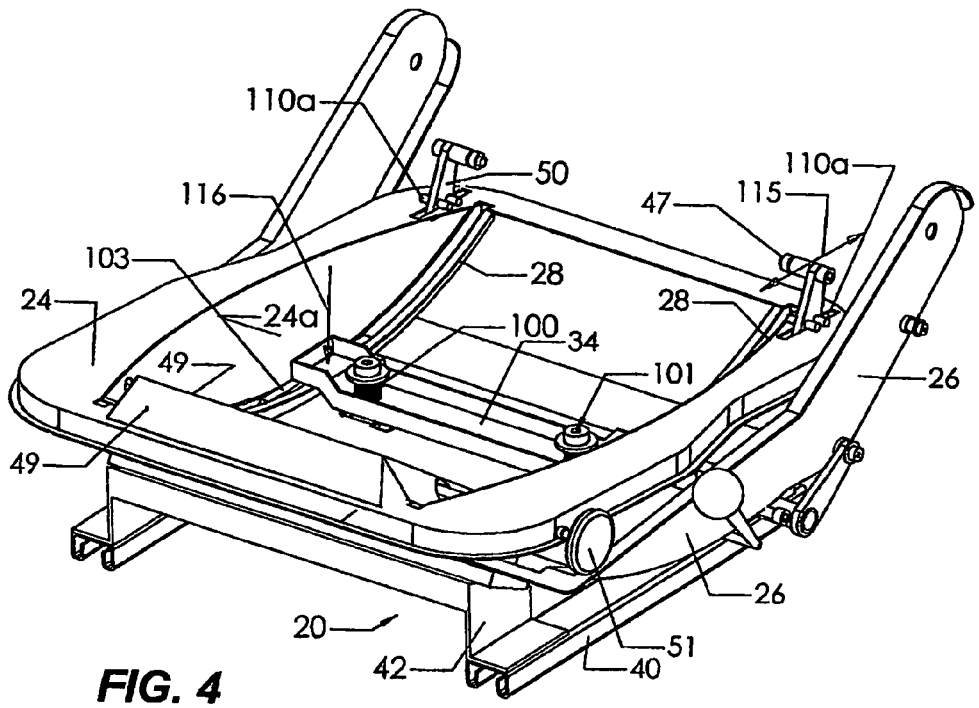
FIG. 4 is a top pictorial view of the seat assembly and seat mounting assembly of FIG. 1 with the backrest frame and backrest removed showing seat motion and control elements.

Movable seat 22 may advantageously be formed with an upwardly concaved seat pan 24, as best seen in FIG. 4. Movable seat pan 24 is received by and nested in a stationary mounting assembly or shell 26. A restraining upwardly inclined anti-submarining member 49 is advantageously provided at the front of seat pan 24. The front end of planar restraining member 49 advantageously includes a lip which extends above seat pan 24 and which combines with the remainder of the seat pan frame to provide a bucket seat support structure over which a cushion schematically illustrated FIG. 1 as cushion 48, extends. Restraining member 49 tends to resist forward sliding or submarining of the person seated on the seat in the event of a frontal impact, as represented by force vector 14 in FIG. 2. Restraining surface 49, therefore works in conjunction with seat motion 35 to resist submarining.

Figure 5:
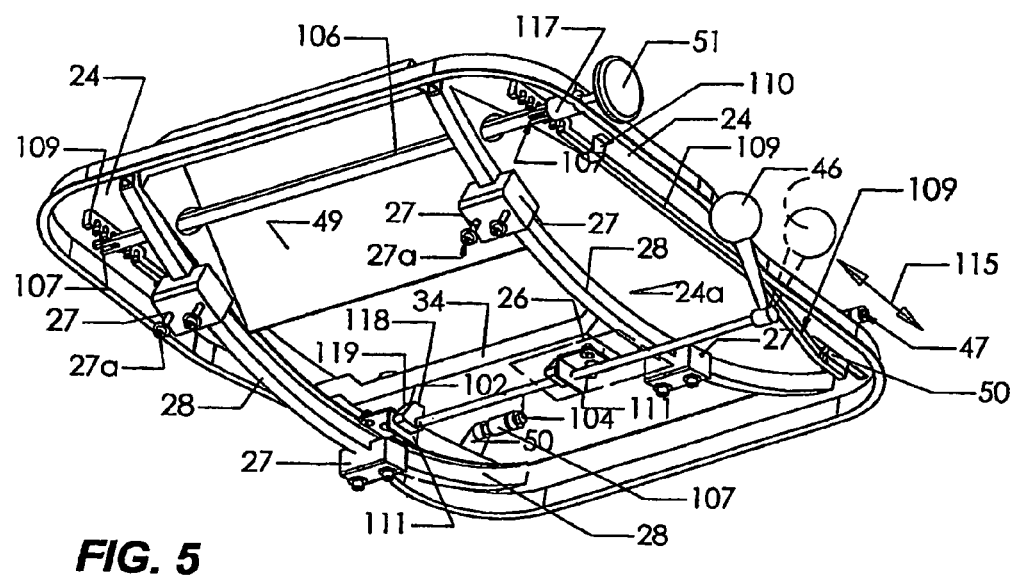
FIG. 5 is a pictorial perspective view of the underside of the seat assembly shown in FIG. 4 with the mounting assembly removed for clarity.

At the bottom of side walls 24a of seat pan 24 are a pair of curve guide tracks 28 (FIGS. 1, 4 and 5) which cooperate with sliders 27 (best seen in FIG. 5). Alternatively, roller elements (not shown) may be substituted for sliders 27. Sliders 27 are provided by a low-friction material and can be mounted by bolts 27a, or other fastening means, to floor mounting members 42 (FIGS. 2 and 4), which, in turn, are carried or fixedly mounted on fore-and-aft seat positioning tracks 40 that are coupled to floor 45 of the vehicle. Tracks 28 can be monolithically formed with seat pan 24 or provided as separately attached guide tracks or channels 140, as shown in FIG. 9A.

As will be understood, therefore, arcuate tracks 28 carried by seat pan 24 will cause arcuate motion of pan 24 relative to stationary sliders or glide members 27, which are fixed relative to the floor of the vehicle. It will be understood that a reversal of parts is possible in which the sliders (or rollers) are carried by the seat pan and the arcuate tracks are carried by the adjustment tracks 40 or mounting members 42 of the seat mounting assembly 20.

A seat restraining cross beam 34 (FIG. 4) prevents seat 22 from separating from sliders 27 and limits movement of the seat to the arcuate path of channels 28. Cross beam 34 has pads 103 mounted at each end which pads slidably engage arcuate track 28 on the side opposite to sliders 27 to rap seat pan 24 therebetween while allowing seat movement. Cross beam 34 is held in place by face 118 of cam 102 (as best seen on underside in FIG. 5), while being biased downwardly by compression springs 100. Cams 102 are fixed to a rod 104, that in turn has handle 46 fixedly attached thereto. Bolts 101 hold springs 100 in FIG. 4 and the lower ends of the bolts are screwed onto brackets 111, that in turn are fixed to support means 26 shown in part in FIG. 5, with a fastener or weld).

To enable the user to selectively lock seat 22 in a desired position against arcuate movement, a seat locking assembly may be provided. The seat locking assembly can include a handle 46 which is turned to the broken line position in FIG. 5 to position cam 102 so that lower side face 119 of the cam is facing up. This provides clearance relative to cross beam 34 and therefore allows springs 100 to push down on friction pads 103, which slows down or stops arcuate channels 28 relative to pads 103. Arrow 116 shows the spring biasing force of the pads 103 cause by spring 100 on channels or tracks 28. Pads 103 are made of material having a coefficient of friction high enough to control seat motion during normal driving and low enough to allow seat deployment at crash impact over known threshold (for example, a force caused by acceleration over 1-5 g).

The seat assembly of the present invention also advantageously includes a seat-femur length and lumbar depth adjuster assembly best seen in FIG. 5. A rotatable adjustment device such as knob 51 is used to turn axel 106 mounted to each side of the pan 24 by bushings 117. Axel 106 has slots 107 that are formed to engage teeth 108 in a lumbar adjustment member or bar 109 that is slidably mounted through bracket 110 to pan 24 and by guide pins 110a (FIG. 4) which slidably rest on the top of pan 24. Bar 109 provides a connection to the backrest link 50 that pivots about pivotal assembly 47, and thus adjustably couples the backrest to the seat. In this manner, when knob 51 is rotated pivot 47 and the lower or lumbar portion of the backrest 25 will move forward or back, as indicated by arrows 115. This movement adjusts the distance from the front edge of the seat to the lower portion of lumbar region of the backrest frame. In effect, by controlling the length of the seat pan the depth of the lumbar support is also controlled. As the person's pelvis is pushed fore-or-aft, the top of the pelvis rotates to increase the lumbar curve.

Seat assembly 21 also includes a backrest assembly, generally designated 25, which is mounted to a backrest frame, generally designated 32. Backrest frame 32 will be seen to extend in a near vertical orientation proximate seat 22, and in the present invention, a first or lower backrest member 35, again shown schematically in FIG. 1, with respect to frame assembly 32.

Figure 6:
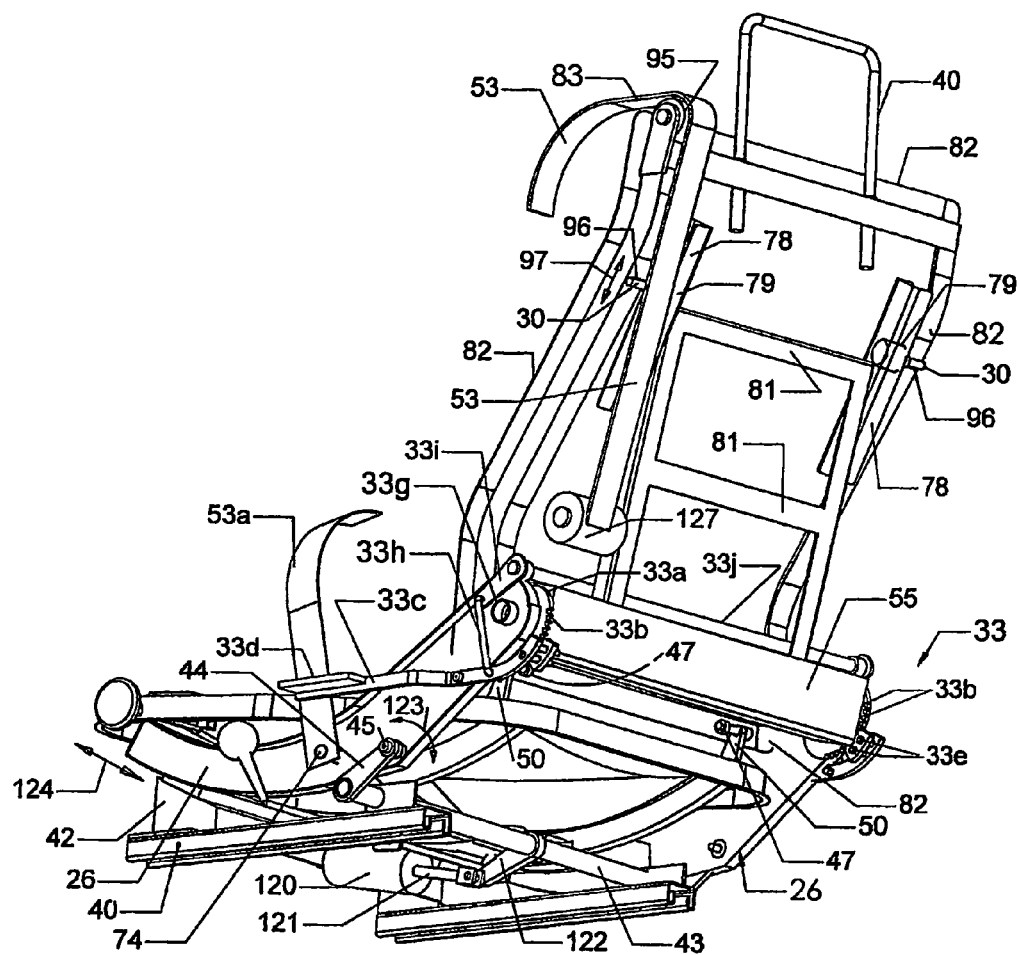
FIG. 6 is a bottom pictorial rear view of an alternative embodiment of the seat assembly of the present invention, showing a backrest frame for a single backrest member, and having a height adjustment assembly.
Figure 7:
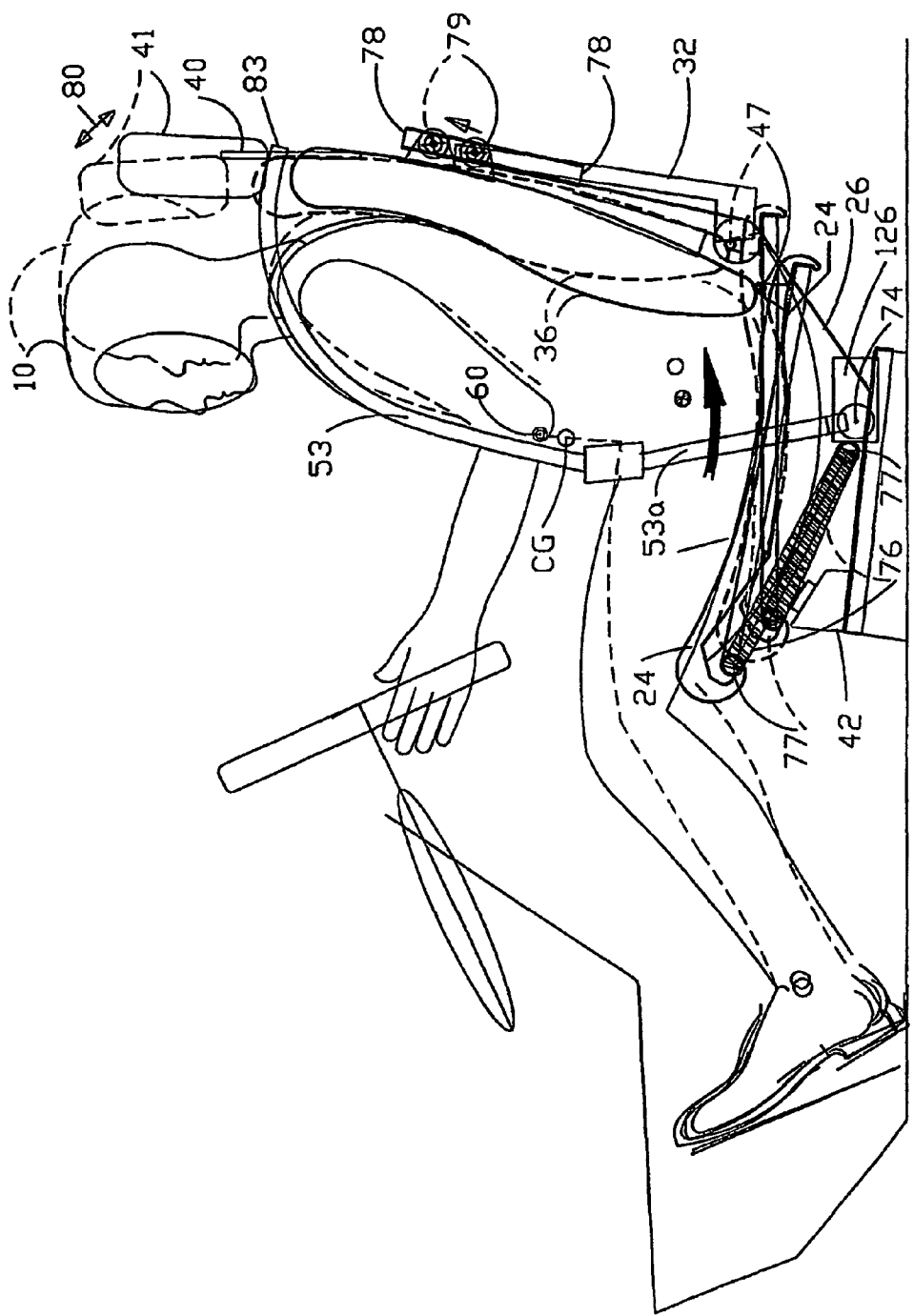
FIG. 7 is a side elevation view of the seat assembly of FIG. 6 shown mounted in the vehicle with the seat cushions shown over the framework and a person seated on the seat in solid line position while driving and in a dotted line position upon rear impact of the vehicle.

In the embodiment of FIGS. 1 and 2 there are two backrest members, a first or lower backrest member 36 and a second or upper backrest member 39, while in the embodiment of FIGS. 6 and 7, a single backrest member 36 is used. Both embodiments have a headrest member 41 mounted to the uppermost backrest member. In FIGS. 1 and 2, headrest 41 is carried by a frame member 40 that, in turn, is mounted to upper backrest frame 38 for vertical adjustment, in a manner well known in the industry. In the embodiment of FIGS. 1 and 2 side bolsters 37 show as outline section also may be mounted over the recliner frame, generally designated 32.

In the improved seat assembly of the present invention, backrest 25 is coupled by link 50 to seat pan 24 for movement therewith. This can be accomplished in several manners, but as illustrated in FIGS. 1 and 2, a lower portion 18 of backrest frame member 23 has link 50 pivoted thereto at pivot connection 47. The lower end of link 50 is secured by bar 109, teeth 108, axle 106 and bushings 117 to seat pan 24, as described above. As seat 22 moves along fore-and-aft arcuate path, as shown by arrow 35, therefore, lower portion 18 of backrest frame 23 will follow the fore-and-aft seat motion. Link 50 can be alternatively fixed or welded directly to seat pan 22.

An upper backrest portion 99 of frame 23 is coupled by pivot member 30 to a slider member 31. Slider 31 moves in channel 29 fixedly carried by backrest recliner frame 32 when the backrest is not reclined, it will be seen that upper portion 99 of lower backrest frame 23 moves in a guided, vertically extending, direction as indicated by arrows 98, as seat 22 moves in an arcuate fore-and-aft direction, as indicated by arrows 35. As shown in the drawings, pivot 30 is at uppermost portion 99 of frame 23, but it will be appreciated that pivot 30 can be moved to a lower position (or a higher position if frame 23 is upwardly extended) without departing from the spirit and teaching of the present invention.

The moveable backrest mounting assembly of the present invention enhances safety in front end impacts, but it is particularly advantageous in enhancing safety when the person's head is accelerated rearwardly. For example, when the vehicle is subjected to a rear end impact, or the person seated on the seat rebounds rearwardly on a frontal impact. The effect of mounting the lower end of the backrest for movement with the seat while keeping the upper end confined by the backrest frame for near vertical displacement can be best seen by reference to FIG. 2. A person 10 is shown in solid lines seated on seat assembly 21 while assuming a posture for normal driving. In a front end impact, as indicated by arrow 14, the person moves to a frontwardly displaced broken line position 10a, at which point the upper body and head are cushioned by airbag 51 and the upper body is restrained by seat belt 53. Seat 22 moves to the forward broken line position shown in FIG. 2, and lower backrest cushion 36 moves to the forward position also shown in broken lines in FIG. 2.

Upon a rear impact as indicated by force vector 15, the person moves back to the posture of intermittent broken or center line of numeral 10b, at which point the headrest 41 moves to the higher vertically displaced position shown by intermittent lead line 41, to better engage the head, and backrest 25 moves to the most rearwardly position to support the user's back.

Thus, in the forward impact situation, coupling of backrest member 36 to move with the seat at its lower end enables the seat to swing to an upward position so as to resist submarining, while having the backrest follow the user's back for most of the deceleration of the person's forward motion. The rise of the front of seat 22 about the center of gravity of the person minimizes stress on the person during the high deceleration of the mass of the person, and the backrest does not inhibit this highly desirable arcuate seat motion. Moreover, when seat 22 is in the forward position, upwardly inclined, anti-submarining seat pan member 49 and cushion 48 cup or hold the person as deceleration occurs.

In the rear impact situation, the seat and lower backrest portion again moves about the center of mass of the person so as to minimize the person's mass acceleration, and the backrest straightens up, raising the headrest assembly 41 upwardly along arrow 88 to support the head as it moves rearwardly against cushion 41. Again, lower portion 18 of the backrest frame 23 and cushion 36 move with the seat and do not interfere with or inhibit arcuate motion of the seat about axis 60.

A person seated on fixed seats in a vehicle tends to relax and slide into flexion curving the spine causing sagging of the lumbar curve and reduced back support. In the seat assembly of the present invention, the position of the backrest relative to the position of the seat corrects this deficiency. The lumbar support area comes closer to the lower back of the person as the seat cushion moves forward to significantly increase low back support as the angle between the seat and the backrest becomes more acute.

When the seat rotates rearwardly voluntarily or under a rear end impact, the backrest and headrest move up closer to the shoulders and head, thus improving support.

While the guided channels 19 in the illustrated embodiment are linear, it will be understood that motion of upper end 99 of backrest frame 23 also could be guided for arcuate motion which is slightly concaved in a forward direction.

An important aspect for the proper functioning of a dynamic seat related to safety is the location of the center of rotation of the seat. The seat's center of motion 60 most preferably is 34 mm above the center of mass, CG, of the seated person. Numerous crash tests have established that there will be a reduction in injury loads during the crash. The seat of the present invention significantly contributes to the reduction of injury loads of about 30% to comply with federal standards tests, FMVSS 208, 30 mph belted and unbelted; Offset Impact, 40 mph Belted; and US-NCAP, 35 mph Belted. The dynamics provided by the enhanced protection of the present seat assembly against frontal and rear impacts reduce crippling injuries and in some cases reduce the likelihood of a fatality.

Figure 8:
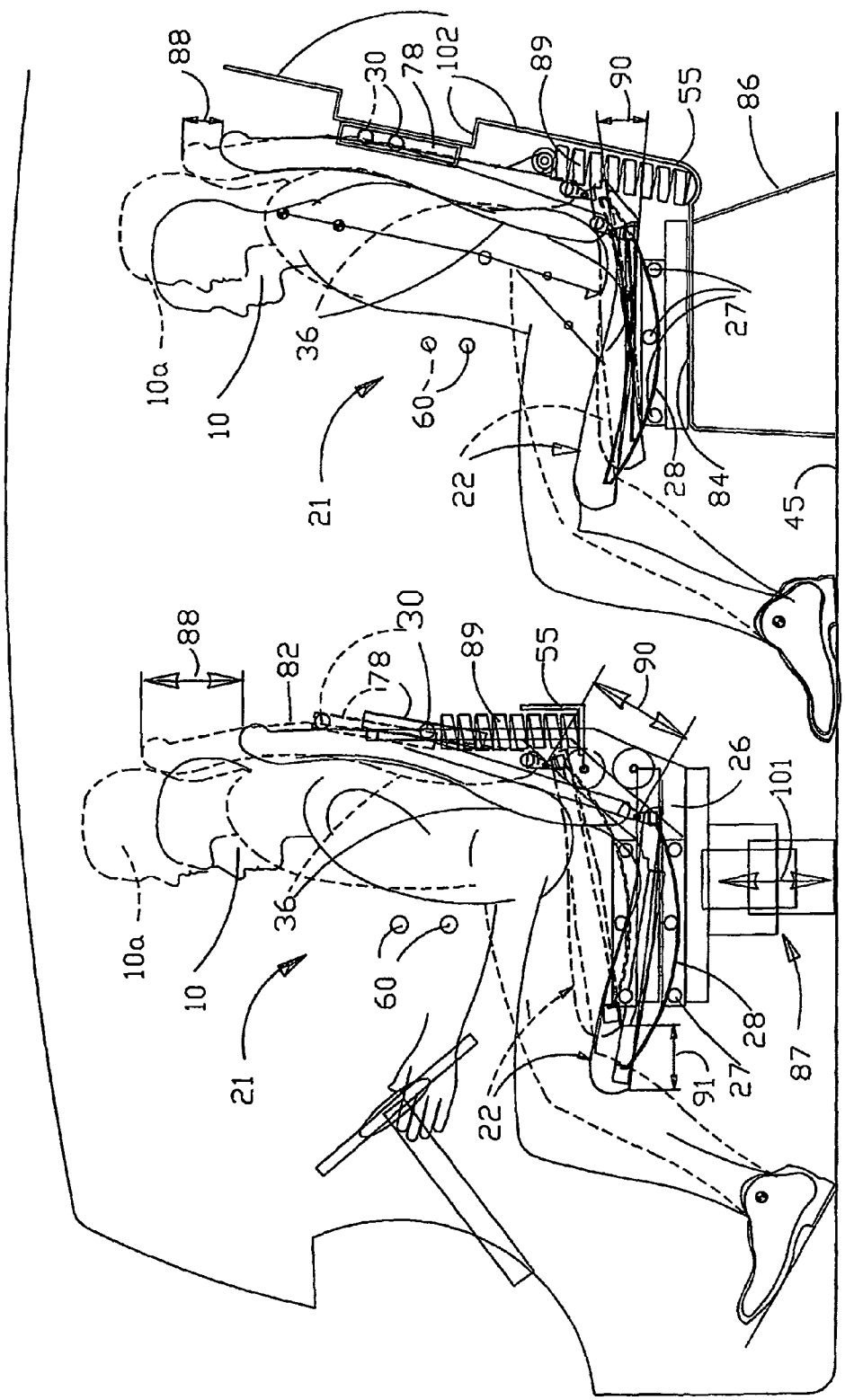
FIG. 8 is a side elevation view of further embodiments of the seat assembly as shown mounted in a vehicle, such as a van, with a seat suspension assembly for the front seat and a rear seat installation.

Another important feature of the present invention is that together with backrest motion and seat/backrest deceleration function 76 shown in FIG. 7 or 89 shown in FIG. 8 provides a shock absorber means for frontal or rear impacts.

Figure 3:
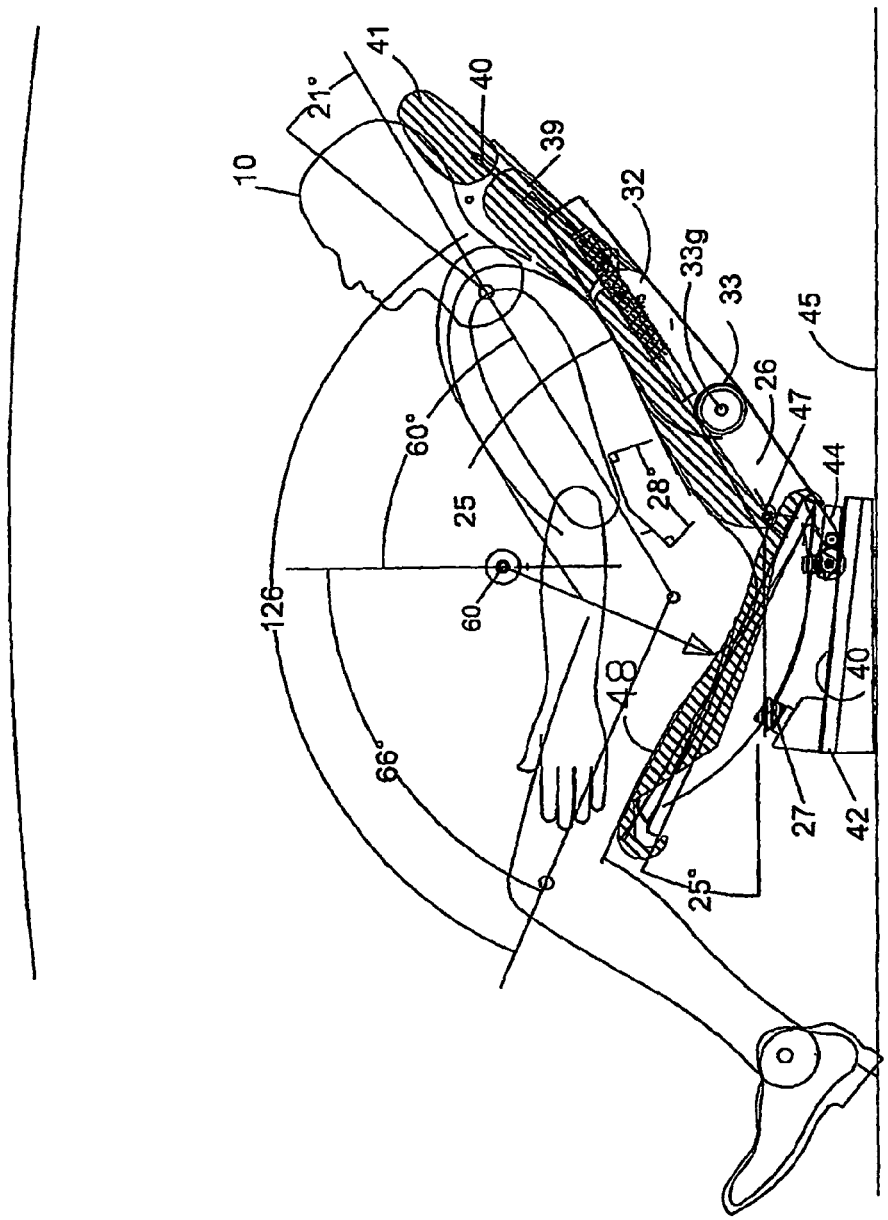
FIG. 3 is a side elevation view of the seat assembly of FIG. 1 with the seat assembly shown in a reclined position with the seat tilted upwardly and backrest tilted back.

The seat assembly of the present invention further preferably includes a recliner assembly, generally designated 33. FIG. 3 shows recliner assembly 33 at what is preferably its full reclined limit, namely thirty-five degrees rearwardly of the position in FIGS. 1 and 2. Recliner mechanism 33, best seen in FIGS. 12 and 6, is coupled between upwardly and rearwardly extending arms of seat assembly mounting shell 26, and a back recliner frame 32 and 81, to which backrest channels 29 or 78 in FIG. 6 are fixedly mounted, is provided which is separate and apart from the movable backrest frame 23 and 82. The mechanism for selectively locking and releasing recliner frame 32 for reclining can take any one of a number of standard forms which allow selected tilting of backrest frame 32 rearwardly from its orientation in FIG. 2 to that of FIG. 3 or FIG. 6.

As shown in the drawing, member 33a has an arcuate array of teeth 33b. This rack or gear member 33a is fixedly carried by the recliner frame. A pivotal arm 33c having handle 33d is mounted to stationary seat mounting shell 26. At least one interlocking member, such as pins 33e are carried by end of arm 33c and interengage with teeth 33b. Arm 33c may be rotated upwardly about pivot 33f to release pins 33e from teeth 33b to allow motion of recliner frame 32 relative to mounting member 26 about pivot 33g. Link 33h (FIG. 6) coupled to arm 33i which is keyed to transverse axle 33j transmit arm 33c motion to the other side of the assembly to release the pins from rack or gear 33a on the other side of the seat.

FIG. 3 shows the preferred reclined angular geometry of the person seated on seat assembly 21 in the reclined position, but it will be understood that other angles can be provided for. When seat 22 is in a upwardly inclined position, 66 degrees from vertical as shown in FIG. 3, and the backrest 25 is reclined back from the vertical by 60 degrees, the included angle of 126 degrees between the torso and thighs is regarded as a neutral body posture whereas the muscular-skeletal system is in equilibrium at rest (NSA-NBP). Sleeper posture is intended for transportation uses such as aircraft seats. It will be noted in FIG. 3 that seat cushion 48 is in the full, forward position with backrest 25 and cushion 36 fully reclined to provide lumbar support for the user's back in the reclined position.

The reclined position of FIG. 3 is much more effective in distributing the weight of the user over the seat and seat back than is true for fixed seats which remain horizontal. When sitting on a horizontal fixed seat with a reclined back, the user's weight is concentrated on the buttocks, and the thighs are lifted up off the seat losing support. The user tends to slide forwardly off the seat unless his or her buttocks digs into the cushion. The lumbar curvature also loses support which is undesirable.

In the present seat assembly, the front edge of the seat rises up under the thighs and the user's weight is more evenly supported over the area of cushion 48. The backrest cushion 36 follows the seat and maintains a desirable forward thrust to the lumbar region.

Additionally, and very importantly, seat assembly 21 makes more efficient use of space than simply reclining the seat backrest cushion assembly from proximate the rear of the seat. Thus, seat 48 moves forward, as does the back rest assembly during seat motion when the backrest is reclined about pivot point 33g. The headrest also is lowered so that in an airline application, for example, the backrest does not invade the space of the seat behind to the same degree as occurs for conventional reclinable seats.

FIGS. 6 and 7 illustrate an alternative embodiment of the seat assembly in which a single backrest member or cushion 36 has been used, which backrest member extends up to the user's shoulders. Thus, upper backrest member or cushion 39 of FIGS. 1 and 2 has been combined, in effect, with lower backrest member or cushion 36. A modified backrest frame 82 also is provided. Frame 82 again is linked or coupled for movement with seat 22 by a pair of pivots 47 and connected links 50, which are secured to seat pan 24, as above described. Frame 82 is mounted for vertically extending movement, as indicated by arrows 97 by a pair of axles 30, which are welded at 96 to frame 82 somewhat above the middle of frame 82. Axles 96 carry rollers or slider assemblies 79 that move up and down in guide channels 78. This allows the movable backrest frame 82 to be separated from the tiltable recliner frame 81.

Channels 78 are fixed proximate a top end of a separate back recliner frame 81. A cross beam 55 is provided at a lower end of frame 81 and recliner mechanism 33 is secured to cross beam 55. This assembly fixes the position of the slide plane formed by channels 78 relative to stationary seat assembly support structure 26. Thus, for any selected recliner frame angle, backrest frame 82 can move fore-and-aft with seat 22 and its lower end and can slide or roll up and down along arrow 80 at its upper end.

The backrest of FIGS. 6 and 7 is designed to receive side bolsters fixed to movable backrest frame 82. A back cover, not shown for simplicity, also can be provided to hide intermediate back recliner frame 81. In the embodiment of FIGS. 6 and 7, headrest support member 40 is fixed to backrest frame 82 and headrest cushion 41 moves with backrest cushion 36, as best can be seen in FIG. 7.

FIG. 6 also discloses a height adjustment mechanism for seating assembly 21. An electric motor 120 may be used to extend a rod 121, which rotates link 122. Link 122 is secured to rotate axel 43, which, in turn, is coupled to rotate height adjusting links 44. Pivot assemblies 45 attach links 44 to the seat assembly support structure 26. By extending or shortening rod 121, link 44 will rotate, as shown by direction arrow 123. Support structure arm 26 also is caused to move forward and back along direction arrow 124, which is supported on an inclined plane at the frontal cross bean 42 by sliding means securing 26 to 42 with a bolt and mating fore and aft slotted holes in a conventional manner (not shown). In this manner the seating assembly 21 can be adjusted up or down.

The range of arcuate motion of seat 22 can be as much as 35 degrees in a forward direction and 20 degrees rearward. These limits can be altered to meet the need of the seat's application.

As is typical in many automobiles and as is shown in FIGS. 5, 6 and 7, a restraint device, such as a shoulder belt 53, may be provided. Belt 53 has an upper end 83 mounted over a roller assembly 95 and coupled to upper end of movable backrest frame 82, by a standard retractor and/or load limiter 127. A lap portion 53a of belt 53 is secured at anchor 74 to seat mounting structure 26 at a position located straight below the user's hip joint, on the window side of seat 21. An opposite end of belt portion 53a with standard buckle 120 is symmetrically anchored at the other side of seat 21. Pretension, retractors and load limiters 127 also can be installed at anchor points 74 and secured to the backrest frame assembly support structure 26, or on the floor structure, or a pillar provided in the vehicle.

In addition, when belt anchors are located on the floor 45, lap belt 53a can be rerouted with a roller and pin, which provides a continuous loop anchor point located preferably straight under the hip-femur joint fixed at the location of anchor 74; in this manner the belt causes the body to be pulled down into the seat during a crash event. More typically anchor points 74 would be located to the rear of the seat in a fixed seat assembly so as to pull back on the user during a crash event. More typically anchor point 74 would be located to the rear of the seat in a fixed seat assembly so as to pull back on the user during a crash event. In the present invention, having an arcuately movable seat, however, anchor 74 insures that the user is held down against the seat as the seat moves along its arcuate path. A rearwardly positioned anchor point for lap belt portion 53a would resist seat arcuate motion but can also be accomplished by using belt material that stretches with more elongation to allow seat arcuate motion.

In FIG. 7, a ten degree range of self-adjustment motion is shown during normal driving conditions. Extending the legs by a voluntary change in posture can be used to produce rotation of the seat assembly. That rotation about axis 60, in turn, causes a change in the height and angular position of backrest 36, raising headrest 41 upwardly by about 50 mm. When seat 22 rotates rearward, the backrest and headrest move up curving in closer to support the head, as shown by arrows 80. In this position the occupant can easily rest his or her head on the headrest, and can easily reach a comfortable balance, while still having his or her eyes on the road. In this manner, the entire supporting cushion assembly can be adjusted between very upright and somewhat reclined postures, by just rotating the seat angle with voluntary motion of the legs, buttocks or torso.

Meeting the goal of maintaining a stable body equilibrium involves preventing backrest 36 from moving downward by weight. Maintaining a dynamic equilibrium state can be assisted by motion controller 76 of FIGS. 7 and 89 in FIG. 8. Motion controller 76 applies a force which biases seat 22 to balance the seat against the gravitational pull of the weight of the user's torso on the seat. Such biasing can be accomplished by compression springs 76, coupled by attachment devices 77 at the frontal edge of seat pan 24 and at floor mounting assembly 42, or at the seat support or mounting shell 26.

Although not shown, a biasing adjustment assembly also can be provided for example, a cam that can regulate the spring force by gradually compressing spring 76. The cam can be set at different positions to adjust the equilibrium point for different sized people. Biasing of seat 22 rearwardly resists the tendency of the user to slouch or slide the hips forwardly.

Motion controller 76 can also take the form of a shock absorber (not shown) which causes resilient displacement of the buttock against the shock absorber when deceleration on the seat exceeds a know force (for example, is greater than 2-5 kN).

Control device 76 also can take the form of a piston in a pressure cylinder with a pyrotechnic device having the ignition timing controlled by the vehicle's computer or other restraints deployment system. Thus, an electric solenoid can actuate or ignite the pyrotechnic device at collision to boost or accelerate seat rotation and the compound backrest motion.

Motion controller 76 can alternatively be controlled by the driver during normal operation for comfort and control of the seat tilt motion by a manual switch or an on-board computer.

In FIG. 8, shows the seat assembly of the present invention mounted in a vehicle such as a van or truck having in the front seat position a taller floor mounting suspension means 87. Suspension assembly 87 can be used in heavier vehicles to cushion road bumps or potholes. Rear seat position in FIG. 8 shows the present seat assembly mounted to a deck 84 having legs 86 supported and attached to vehicle floor 45.

When the vehicle is driven over a bump, the cab jumps up, moving the entire seating assembly 21 upwardly. Thus, the driver moves from the solid line position 10 to the broken line position 10a.

The lower end of backrest member 36 moves along an arcuate path, as shown by arrows 90, as the seat moves rearwardly along an arcuate path, and the upper end of cushion 36 moves upwardly, as shown by arrows 88. The driver's body remains aligned during this motion with the driver's foot on the floor or gas pedal.

Backrest biasing compression spring 89 provides a dynamic seat balancing force and additional suspension function which may be applied between seat recliner frame cross member 55, that is mounted to seat mounting structure 26, and backrest frame 82, at approximately the level of axles 30. Spring 89 balances assembly 21 against downward body motion.

The total trajectory of the body, therefore, is influenced by two structures. First, suspension 87, which displaces as indicated by arrows 101, and second by the movement of the seat assembly of the present invention, which moves as indicated by arrows 88, 90 and 91. In this manner, seat assembly 21 adjusts to support the body during changes in posture and/or during an occurrence of violent vertical or horizontal acceleration.

Although not shown, using a turning knob or motorized means to cause seat movement by selectively rotating the rollers elements 27 around its axis and thereby rotate seat track 28 to a new position can be utilized.

The seat assemblies of FIG. 8 are constructed substantially as described in FIGS. 1-5. In addition to suspension 87 and floor mount 84, 86, rollers 27 guide arcuate motion of seat 22 on guide tracks 28 instead of sliders. Moreover, seat 36 is a single member with a recliner frame 81 or 32 constructed as shown in FIGS. 1, 6 and 7, and the back seat in FIG. 8 is mounted to a rear wall or panel 102 of the vehicle.

Turning now to FIGS. 9A-9C, an embodiment is shown in which arcuate guide tracks 140 were formed as separate members that are affixed by fasteners, welding or the like to seat pan 24 proximate the bottom of side walls 24a of the seat pan. Mounted to support guide tracks 140 are arcuate members 141, which are secured to mounting member 42. Arcuate seat tracks 140 are movably supported on arcuate members 141 by a plurality of ball or roller bearings 142, best seen in FIGS. 9B and 9C.

In addition to the guide track arrangement show, FIGS. 9A-9C illustrate a seat releasable locking or detent assembly, generally designated 130, that will hold the tracks 140 in a fixed location on arcuate supports 141 until an inertial threshold is exceeded, for example, in a frontal rapid deceleration of 2 gs.

In enlarged scale sectional views 9B and 9C show an inertia locking/release assembly 130 formed to include a vertically reciprocal pin 132 slidably mounted inside bushing or sleeve 134 and formed with a pointed or tapered end 128 which is dimensioned to protrude through selected ones of a plurality of holes or mating pockets 139. In FIG. 9B pin 132 is shown retracted in the solid lines and cross-hatched and is shown with tapered end 128 in holes 139 in broken lines. Movement of pin 132 between the solid line and broken line positions can be manually activated by handle 131.

Handle 131 is used to turn shaft 137 inside busing 136, as indicated by rotation arrows 145 shown in FIG. 9C. Pin 132 is pushed up or down by a finger member 146 having a forked end which fits in a notch 103 in pin 132. When handle 131 is rotated, shaft 137 rotates and finger 146 is tilted. Finger 146 can be mounted through a transverse bore through shaft 137 and held in place by a set screw 146a. The outer end of finer 146 can be formed with a cylindrical cup 135. Inside cylindrical cup 135 a spring 143 biases ball 144 against the side of housing 138. In this manner, when pin 132 is engaged in pockets 139, spring 143 is biasing finger 146 upwards and, therefore, pin 132 against into pockets 139 of track 140. Although not shown, it can be used in curved track 28. The detent pin will remain biased upwardly locking seat 22 to support member 141 on cross beam 42, the seat assembly support structure 26 is not shown for clarity.

Release of seat 22 for arcuate motion can occur in either a fore-or-aft direction by acceleration of track 140 and seat 22, represented by vector arrows 104 in FIG. 9C. Thus, in frontal crashes or upon rear end impacts as tracks 140 that define holes or pockets 139 push the inclined face 128 of pin 132 fore or aft, pin 132 is displaced down to the solid line position in FIG. 9B or the broken line position of FIG. 9C. As ball 144 passes over the center line of the tilt range of finger 146, spring 143 biases the finger to the downward or pin retracted position.

Manual release of seat motion is accomplished by turning handle 131 in a counter clockwise direction to tilt finger 146 in a counterclockwise direction in FIG. 9C and displace pin 132 to the lowered position. Cylindrical cup 135 is rotated upward, about 30 degrees along arrow 145, biasing pin 132 downward with sufficient clearance to displace end 128 out of opening 139 in track 140, which releases the track and seat for arcuate movement.

Figure 10B:
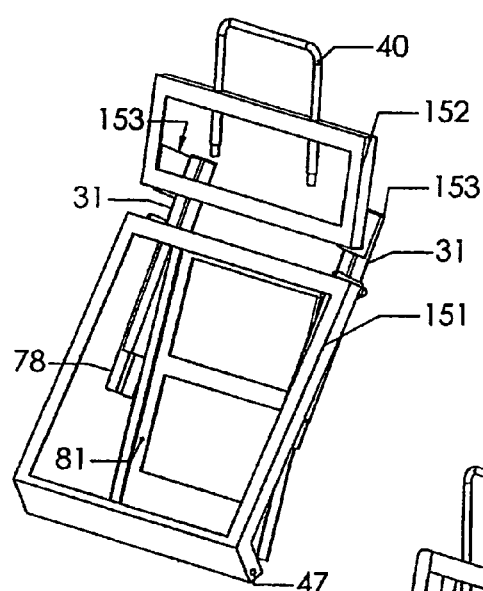
FIG. 10B is a top pictorial view of a two section backrest frame mounted to a recliner frame with a headrest frame mounted for movement with the upper backrest.
Figure 10C:
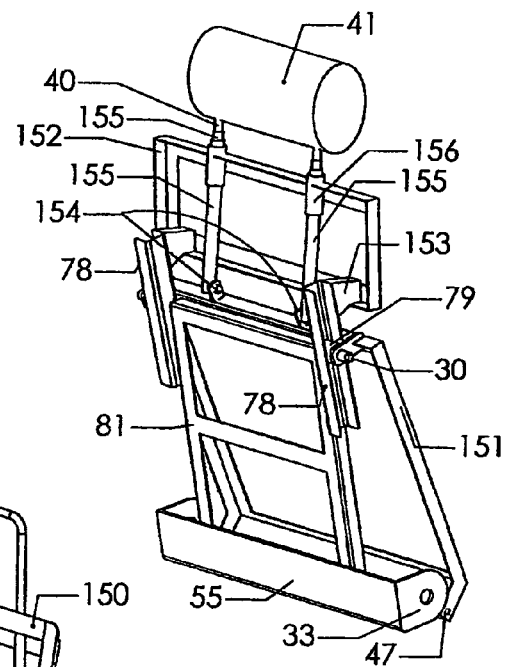
FIG. 10C is a rear pictorial view of a two section backrest frame mounted to a recliner frame with upper backrest frame section being fixed to the recliner frame and the headrest being mounted for movement to the lower backrest frame section.
Figure 10A:
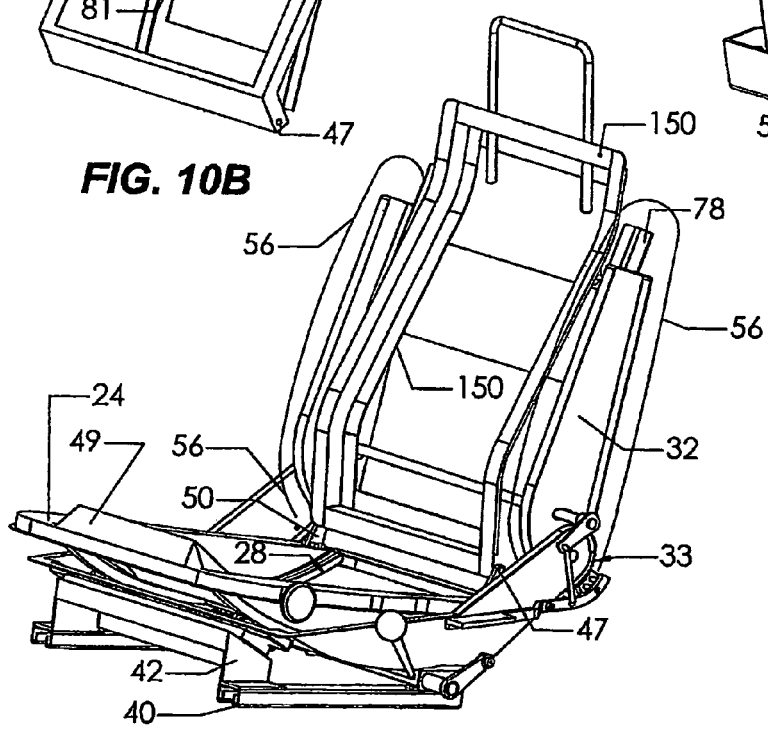
FIG. 10A is a top pictorial view of an alternative embodiment of the seat assembly of the present invention showing a single backrest frame member mounted to a recliner frame to which side bolsters can also be mounted.

FIGS. 10A and 10C are perspective views of three alternative embodiments of the moveable backrest frame and the separate recliner frames of the seat assembly of the present invention.

FIG. 10A shows a one-piece movable backrest frame 150 that moves according to the present invention between relatively stationary side bolsters 56, schematically shown. Bolster 56 are fixed to recliner frame 32. In this manner side bolsters 56 and a backrest back cover, or seat belts, not shown here for simplicity, can remain firmly attached to recliner mechanism 33 during motion of backrest frame 150.

FIG. 10B is a seat assembly having a two-piece, full width backrest frame assembly with a lower backrest frame portion 151 and an attached upper backrest frame portion 152. A pivot pin 30 connects lower backrest frame 151 to slider member 31. Fixed to a connecting plate 153 is upper backrest frame portion 152 that also is attached to slider 31 for movement therewith. Frame portion 152, therefore, moves up and down along the line of mating guide channels 78. Channels 78 are, in turn structurally fixed to separate recliner frame member 81. pivot assembly 47 is linked y links, not shown, to the seat, as described in connection with FIGS. 1-5. Backrest frame 151.

FIG. 10C discloses a backrest assembly comprising a recliner frame member 81 with cross beam 55 proximate a bottom end thereof. Recliner mechanism 33 carries guide channels 78, which are structurally fixed to the seat mounting assembly (not shown) as was described in connection with FIGS. 1-5. Connecting plate 153 couples upper backrest frame portion 152 to recliner frame 81. Pivot 47 is coupled by link (such as link 50) to the seat pan so that frame 151 moves fore-and-aft in the arcuate path following the seat. An upper edge of backrest frame 151 is connected by pivot 30 to rollers 79 for vertical movement as guided by sliding channels 78.

Coupled by pins 154 to an upper edge of the movable lumbar support frame member 151 are tubular members 155, that extend through bushing 156 and are fixed to upper backrest frame portion 152. Joining of bushing 156 to the upper edge of frame neighbor 152 is preferably flexible to allow any misalignment of member 155 due to arcuate seat motion. Headrest 41 is carried by frame member 40 that is telescoped inside tubular members 155 to enable adjustment of the height of the headrest. In this manner, upper backrest frame portion 152 remains fixed to recliner frame member 81, and lumbar frame member 151 is formed to follow arcuate seat pan motion at the lower end and to reciprocate at the upper end.

Figure 11:
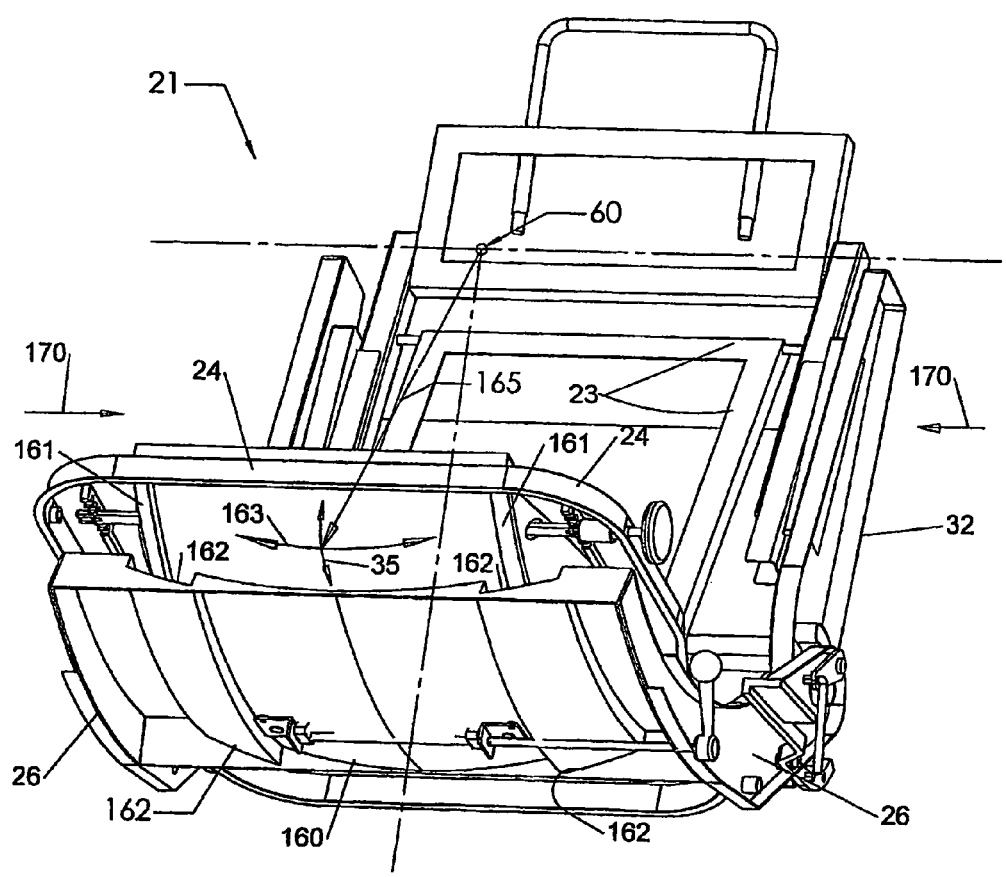
FIG. 11 is a front elevation view of a seat assembly of the present invention, shown mounted on a laterally displaceable mounting assembly.

FIG. 11 is an alternative embodiment of seat assembly 21 in the present invention in which lateral seat motion is implemented using spherical support of the seat by the seat mounting assembly. Vehicles, of course, are subjected to lateral and/or of-set impacts which produce rapid acceleration of the vehicles' occupants. Thus, complex compound force vectors can be applied to the vehicle which will not necessarily be aligned with the fore-and-aft seat motion of the embodiments of the present invention described above. The seat assembly of FIG. 11 is constructed in a manner which enables seat movement that will at least partially accommodate or reduce the shock and vibration from lateral diagonal and off-set (not axially aligned or directly head-on) crashes, as well as frontal and rear impacts.

In the embodiment of FIG. 11 guide tracks 161 having a spherical surface are provided on seat pan 24, while mating spherical support surfaces 162 are provided on seat mounting structure 26. In the FIG. 11 embodiment support, surfaces 162 are connected by an intermediate surface 160 for structural rigidity. Surface 160 is shown as a spherical surface too, but a cylindrical, arcuate or discontinuous reinforcing structure 160 between spherical support surfaces also could be employed because surface 160 does not directly support tracks 161 or seat pan 24. Tracks 161 are mated with support surfaces 162 for sliding contact therewith and tracks 161 and surfaces 162 preferably have substantially the same radius of curvature 165 and axis rotation centered at point 60 that is generally proximate to the center of mass of the occupant. Seat 24 as shown will, therefore, be supported for movement in the fore-and-aft direction, as shown by arrows 35, in a lateral direction, as shown by arrows 163, and in directions which are various combinations of fore-and-aft and lateral directions.

As was the case for other embodiments of the present invention, movable backrest frame 23 is coupled at a lower end to seat pan 24 for movement therewith while upper end 99 is coupled to separate recliner frame 32 at 30 for vertical reciprocation in response to seat movement. Since seat pan 24 can move along a spherical path, it is preferable that link 50 be coupled to backrest frame 23 by spherical coupling rather than a mere pivotal coupling 47. A spherical coupling at point 47 will reduce the tendency to twist backrest frame 23 in a manner sufficient to significantly impede spherical seat movement under lateral impact force vectors, such as vectors 170. Some resilient frame twisting can be experienced without materially affecting the seat's performance and some difference in height of pivots 30 at each side will also accommodate and relive said frame twisting.

The advantage intended by the embodiment of FIG. 11 is to reduce injury causing forces and to improve safety during an offset frontal crash, such as proposed by NHTSA, and/or a side impact crash. In addition, when applied to an off road vehicles or industrial equipment such as a tractor, seat assembly 21 of FIG. 11 will act as a lateral suspension to reduce the health hazards of constant pitching and rolling.

The movable backrest framework assembly of the present invention also can be employed with seat mounting structures which only approximate a continuous one radius are about a center of curvature proximate the user's center of gravity. Thus, in FIGS. 12A and 12B two alternative seat mounting structures are illustrated with the movable backrest assembly of the present invention.

Figure 12B:
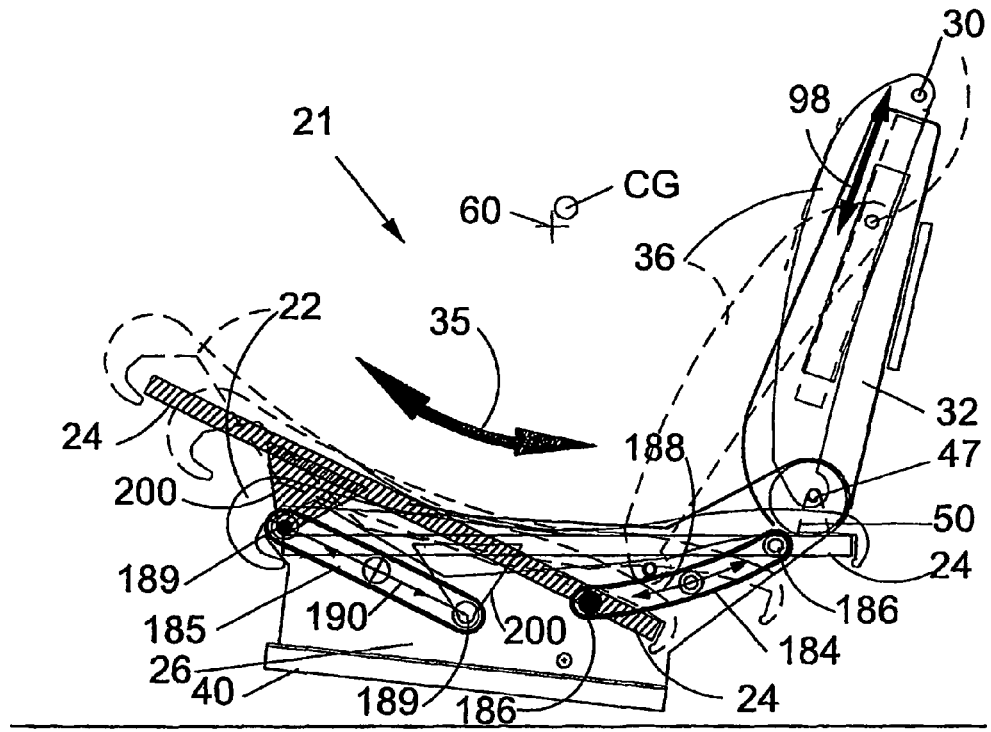
FIG. 12B is a side elevation view of a further alternative embodiment.
Figure 12A:
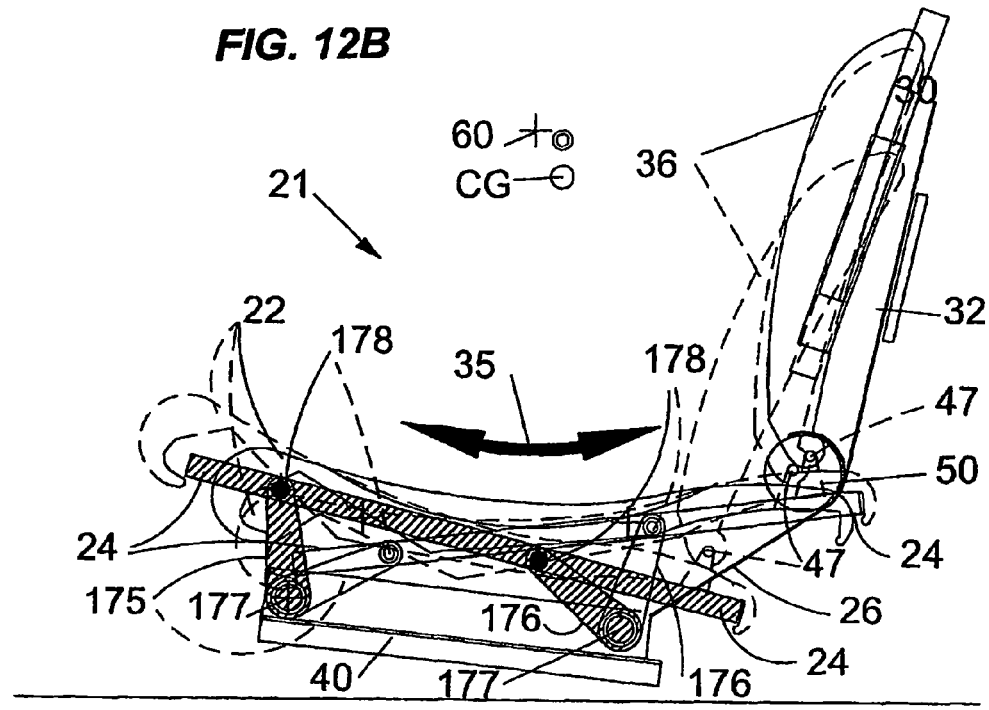
FIG. 12A is a side elevation view of a further alternative embodiment of the assembly of the present invention shown with an alternative seat motion control structure.

In FIG. 12A, arcuate fore-and-aft motion 35 of seat 22 is obtained by the use of pairs of pivoted arms or links. A front pair of arms or links 175 and a rear pair of rear links 176 are provided that pivot about axle assemblies 177 and 178. Axles or pivots 177 are mounted to floor mounting rails 40 or to assembly mounting means 26 while upper axles or pivots 178 are mounted to seat pan 24. Links 175 and 176 rotate about path 179 in the front and about a path 180 in the rear. In this manner, even though the path of motion of the links is a downward arcuate path about the axes 177, seat 22 is caused to move along an upwardly tilting path 35 that has an approximate axis of rotation 60 located proximate center of mass of an occupant seated on seat 22. The upper surface of seat 22, therefore, moves along an arc that is centered about axis rotation 60. As above described in connection with other embodiments, backrest member 36 is coupled to seat pan 24 by a link 50 and a pivot assembly 47.

In FIG. 12B, guide slots 184 and 185 are provided in seat assembly mounting structure 26, and the slots are formed to allow rolling or sliding elements 186 and 189 to travel along paths of motion indicated by arrows 188 and 190. Seat pan 24 is attached to the front rolling element 189 by triangular member 200 and directly to rear rolling element 186 by an axle mounting busing not shown. The rear of the seat pan will travel downward along guide 184 while the front of the seat will travel predominately forward and upward along guide 185. In this manner, the surface of seat 22 will move substantially along an arc that is centered at about axis 60.

Again, the motion of backrest cushion 36 will follow seat motion at its lower end by reason of links 50 and pivots 47. The upper end of backrest cushion 36 is pivoted at 30 to slider 31, as shown by arrow 98. In this manner the combined seat and backrest motion of the present invention can be carried out with alternate seat pan motion mechanisms.

Figure 13:
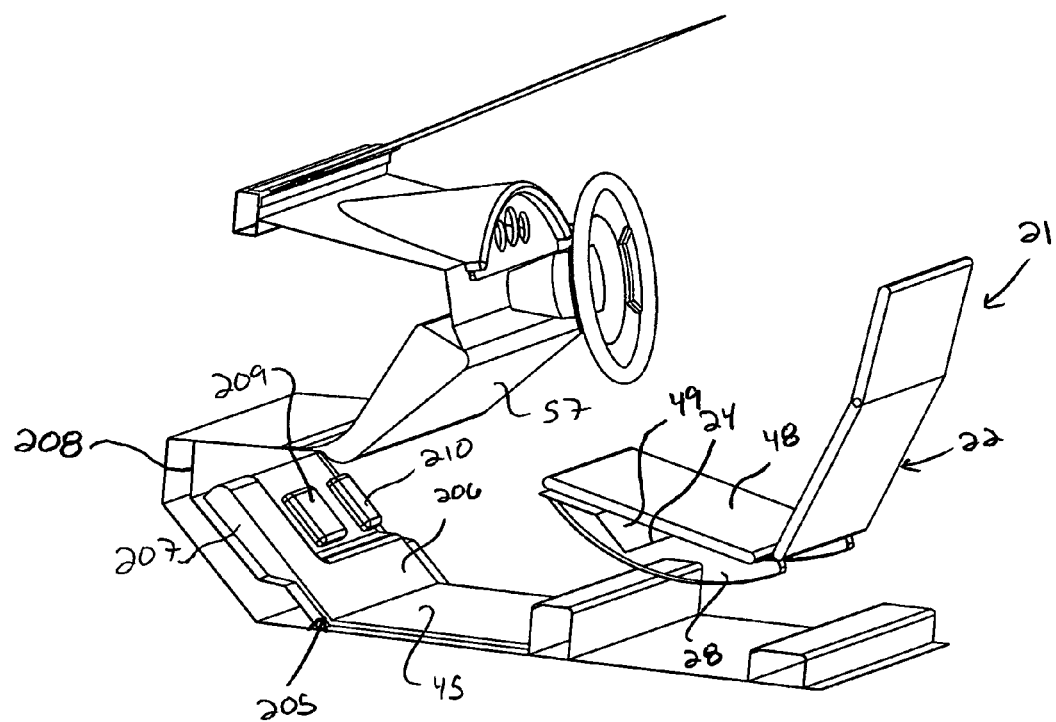
FIG. 13 is a schematic perspective view of a seat assembly similar to that shown in FIG. 1 mounted in a vehicle in conjunction with a foot restraint assembly in accordance with the present invention.
Figure 14:
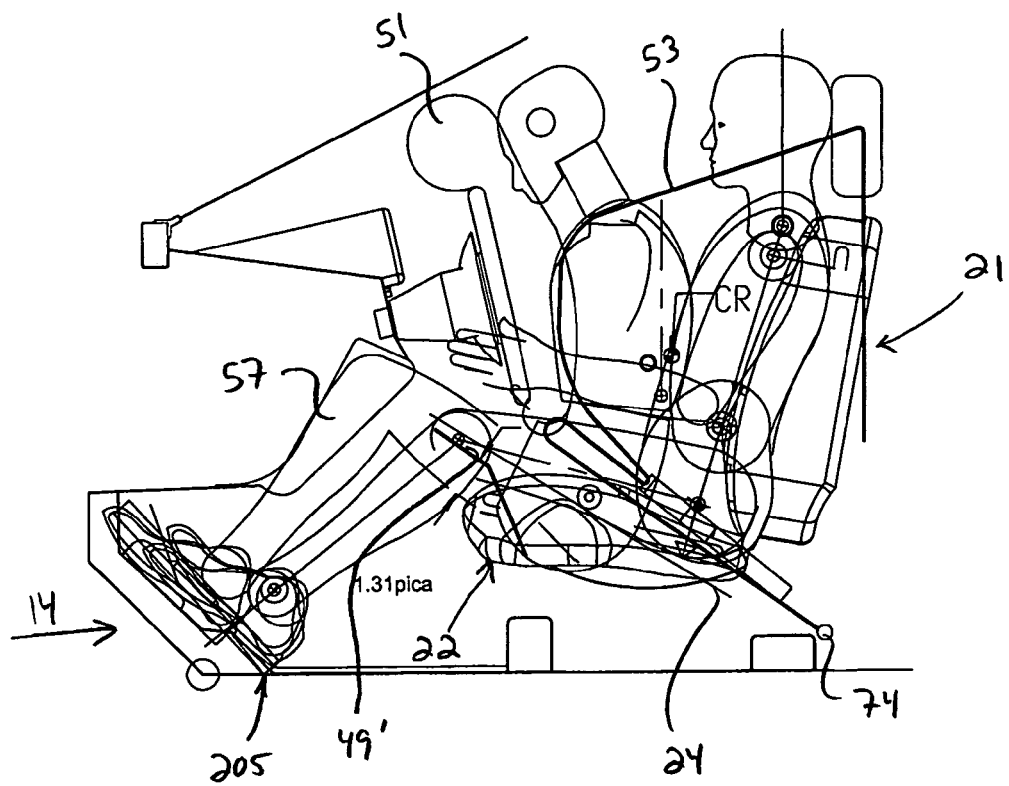
FIG. 14 is a schematic side elevation view of the seat assembly of FIG. 13 with a person seated on the seat and shown in two positions of the range of motion of the seat and backrest assembly in conjunction with other vehicle restraints.

Turning now to FIGS. 13 and 14, along with other features described above, the seat assembly 21 of the present invention may also be provided with a foot deceleration assembly, generally designated 205, which is configured to prohibit feet from sliding forward under the control pedals during the initial stages of a collision. As in the above embodiments, a seat mounting assembly is in a near horizontal orientation for movement along an upwardly concaved, arcuate seat path having at lease one center of curvature proximate the center of mass of a person mounted on seat 22. FIG. 14 shows the center of curvature of path 35 to be located proximate a center of gravity, CG, or center of mass of the person seated on the seat. FIG. 14 also shows a lower leg bolster cushion 57 that can take the form of an airbag to contribute load bearing upon collision in a vehicle, and restraining belt anchor point 74 that can be anchored to the seat mounting assembly in a position substantially below, and rearward of the center of mass of the body.

As discussed above, movable seat 22 may be formed with an upwardly concaved seat pan 24, and a restraining anti-submarining member 49 may be provided at the front of seat pan 24. The front end of planar restraining member 49 extends above seat pan 24 and which combines with the remainder of the seat pan frame to provide a bucket seat support structure over which a cushion, schematically illustrated in FIG. 14 as cushion 48, extends. Movable seat 22 may also be formed with arcuate tracks 28 carried by seat pan 24 to cause arcuate motion of pan 24 relative to stationary sliders or glide members which are fixed relative to the floor of the vehicle, as discussed above.

Upon a front end impact, as indicated by arrow 14, the person moves to a frontwardly displaced position, at which point the upper body and head are cushioned by airbag 51 and the upper body is restrained by seat belt 53. The seat, and in particular, the restraining member of the seat pan moves to the forward position, as indicated by the numeral 49' in FIG. 14. Thus, in the forward impact situation, the seat swings to an upward position so as to resist submarining, while having the backrest follow the user's back for most of the deceleration of the person's forward motion, as discussed above. The rise of the front of seat 22 about the center of gravity of the person minimizes stress on the person during the high deceleration of the mass of the person, and the backrest does not inhibit this highly desirable arcuate seat motion, as discussed above. Moreover, when seat 22 is in the forward position, upwardly inclined, anti-submarining seat pan member 49 holds the person as deceleration occurs.

The foot restraint prevents the person's feet from sliding forward during initial part of a collision. The foot restraint assembly located proximate the brake and accelerator pedals, the foot restraint assembly being dimensioned and configured to prevent a driver's feet from sliding under the brake and accelerator pedals during a collision. Preferably, the foot restraint is provided with an upper surface having a layer of carpet 206 or other suitable material having a relatively high coefficient of friction to prevent foot slippage. In addition, the foot restraint also includes a structural member 207 that vertically spaces the upper surface from the toe pan 208 of the floor such that the upper surface is substantially coplanar or vertically aligned with the bottom edges of the operator pedals, such as the illustrated brake pedal 209 and accelerator pedal 210. One will appreciate that the foot restraint may also be used in conjunction with a vehicle having a clutch pedal and/or other operator pedals adjacent the drivers seat.

The foot restraint may be a structural member affixed to the toe pan with suitable fastening means. Alternatively, the foot restraint may be a unitary structural member monolithically formed in the toe pan 208 by stamping or other suitable means.

In one embodiment, the foot restraint is L-shaped having a side leg extending along a side edge of the brake pedal and a lower leg extending along a lower edge of both of the brake and accelerator pedals. One will appreciate that the foot restraint may have other configurations in accordance with the present invention. For example, the foot restraint may be U-shaped such that it also extends along the inside edge of the accelerator pedal.

FIG. 14 is a schematic illustration of the driver during the peak forces of collision. (e.g., approximately 60-70 milliseconds). Prior to this stage (e.g., approximately 0-60 milliseconds), and as long as the foot remains in contact with the foot restraint, the foot restraint will impart a force to the lower leg which works in conjunction the counter balance motion of the seat. In particular, the reactive force of the foot restraint against the person's legs will, along with the rotational moment of the person and seat about the center of gravity CG, will move the person's legs in towards a fetal posture with knees upwardly, thus allowing clearance and/or moving the person's center of gravity. This will also cause the person's legs to contact knee bolster 57, which in turn, will deform and absorb a portion of the impact energy. As discussed above, seat 21 absorbs much of the force of impact upon the person, particularly the forces upon the lower torso of the person during the early stages of collision, particularly as the persons pelvis accelerates into the seat and is supported by anti-submarining beam 49. As can be seen, the foot restraint, knee bolster and seat absorb a significant amount of energy during the initial 60-70 milliseconds of collision before the upper body contacts and decelerates against the air bag. The resulting impact forces imparted on the body with this method may be significantly lower (e.g., 30%-70% less) as compared to conventional vehicular seat/airbag configurations.

Figure 15A:
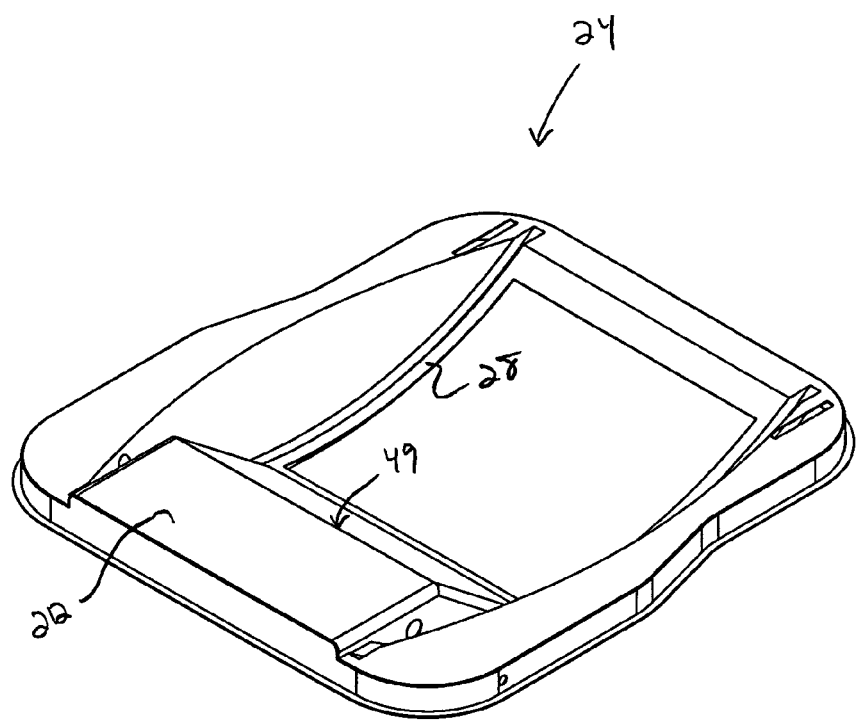
FIGS. 15A and 15B are upper and lower pictorial perspective views of another seat pan which may be utilized in the various seat mounting assemblies including that shown in FIG. 1.
Figure 15B:
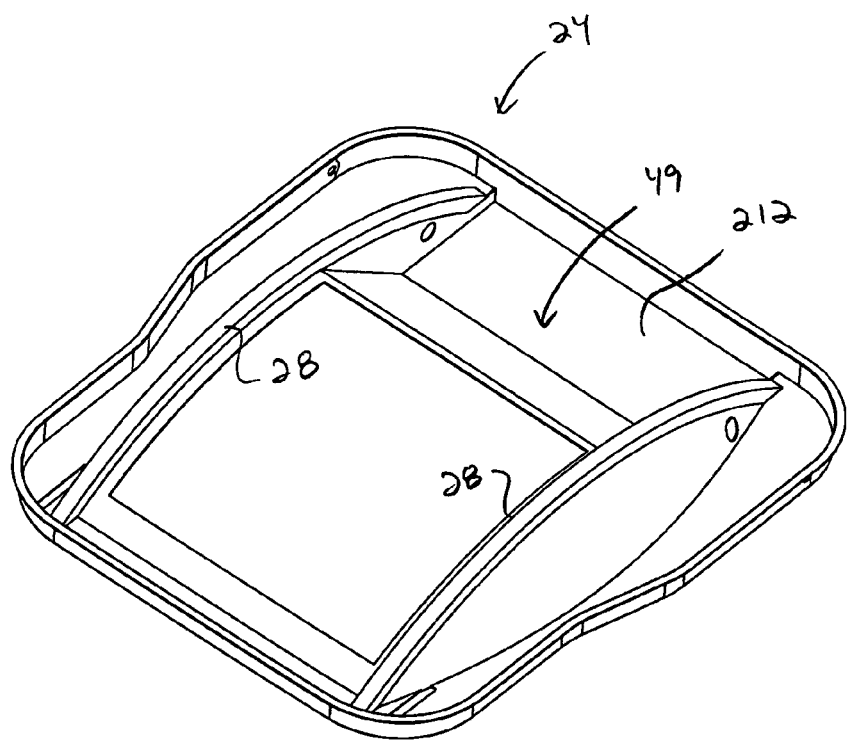

Turning now to FIGS. 15A and 15B, a unitary seat pan 82 is illustrated that substantially similar to that shown in FIGS. 4 and 5. In this embodiment, anti-submarining member 49 is again provided at the front of seat pan 24 but includes a substantially planar section 212 which extends above seat pan 24 and which combines with the remainder of the seat pan frame to provide a bucket seat support structure in a manner similar to that described above.

In both cases, the seat pan is deformable. In particular, the anti-submarining beam 49 of both seat pans is dimensioned and configured to deform at a predetermined threshold of collision force in order to absorb some of the impact energy. The buttocks and thighs will be contained by the deformable seat pan 24, and accordingly there will be significant resistance to movement of the body in a forward direction relative to the rapidly decelerating vehicle by employing the anti-submarining beam securely to deform at a known threshold and thus decelerate the mass of the person seated in seat 22. Preferably, the anti-submarining beam is configured to limit compressive forces against the buttocks and thighs in collisions under 35 mph to ranges below 10 kN, and most preferably below 6 kN, One will appreciate that the specific dimensions of the anti-submarining beam, for example, the length, width and thickness of planar section 212, may be varied in order to provide a beam which deforms at a desired amount of compressive forces.

Figure 16:
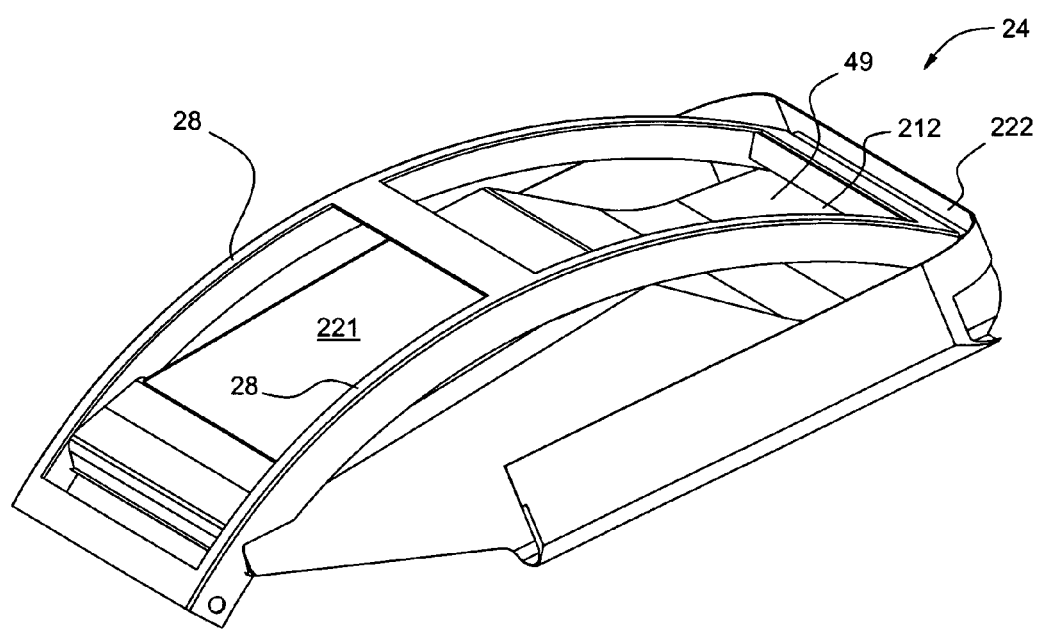
FIG. 16 is a lower perspective view of another seat pan which may be utilized in the various seat mounting assemblies including that shown in FIG. 1

FIG. 16 illustrates yet another seat pan 24 which is similar to those described above but includes discrete seat support structure in the form of guide rails 28. In this embodiment, the guide rails are only affixed to the seat pan at their forward ends 216 and at their rearward ends 217 by suitable means such as front and rear fastening or link members 218 and 219. Such configuration allows the rails to remain substantially undeformed or less deformed in the event of a collision, thus allowing the seat to be returned to a reward position after the collision. One will appreciate that such configuration may facilitate a person seated in the seat to get up from the seat following a collision, or in more severe instances, facilitate rescue workers in removing he person from the seat.

In this embodiment, seat pan 24 also includes a discrete anti-submarining beam 49 which may be attached to the forward edge of a closed bottom 221, and to a forward lip 222 by suitable means. One will appreciate that other suitable configurations may be utilized.

Figures 17A, 17B:
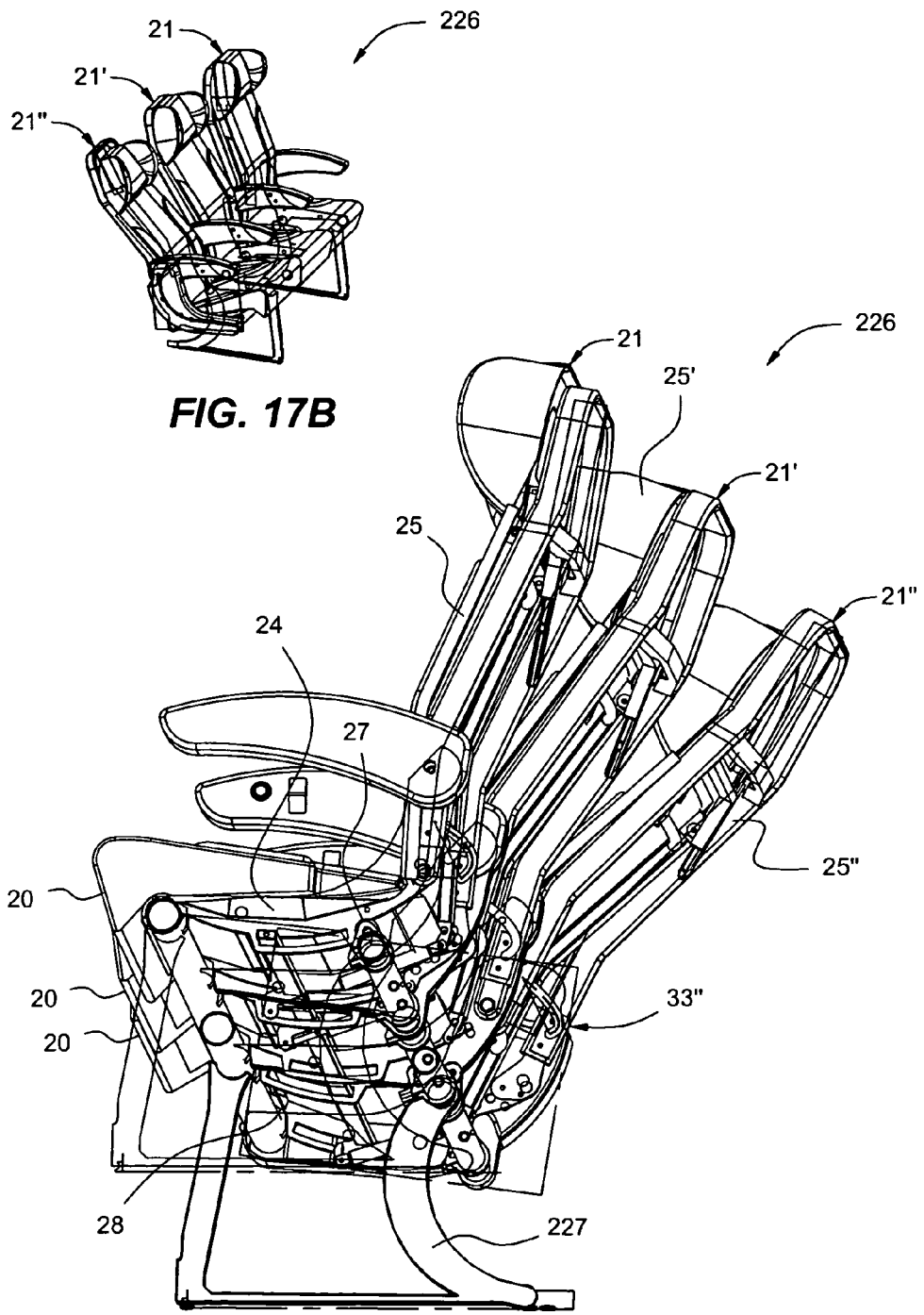
FIG. 17A is a side elevation view of another seat assembly constructed in accordance with the present invention and configured for aircraft use.
FIG. 17B is a perspective view of the seat assembly of FIG. 17A.

FIGS. 17A and 17B disclose a three-seat vehicular assembly designed for aircraft passengers in the main cabin of an air liner. The three-seat assembly includes a seat frame that is dimensioned and configured to be secured to the structure of the aircraft. In many aspects, the assembly is similar to the embodiments shown in FIGS. 6 and 10. A vehicular multi-seat assembly 226 includes three seat assemblies 21, 21', 21", and a corresponding number of seat mounting assemblies 20 and backrest assemblies 25, mounted on a seat assembly frame 227, which in turn is affixed to the floor, frame or other suitable structure of an aircraft cabin by suitable means. As is the case with the seat assemblies discussed above, each seat assembly 21, 21', 21" provides passive and automatic adjustment of the seat, backrest and headrest relative to the seat assembly frame and, in turn, the vehicle.

In the illustrated embodiment, the assembly includes three seats, however, one will appreciate that two, three, four or more seats may be mounted to a single seat assembly frame. Furthermore, one will appreciate that the vehicular seat assembly may be configured for use in the aircraft environment or for use in other types of vehicles, including, but not limited to automobiles, trucks, aquatic vessels, and amusements rides.

Each seat mounting assembly mounts the respective seats in a near horizontal orientation for movement along respective upwardly concaved arcuate seat paths, which are largely defined by the lower profile of curved guide 28. The arcuate seat paths have a center of curvature adjacent a predetermined center of mass zone, in a manner similar to that discussed above. As discussed above, arcuate guides 28 are carried by seat pan 24 and cause arcuate motion of pan 24 relative to stationary sliders or glide members 27 mounted on a forward end of seat assembly frame 227, and relative to stationary rollers mounted on a rearward end of the seat assembly frame. It will be understood that a reversal of parts is possible in which the sliders (or rollers) are carried by the seat pan and the arcuate guides are carried by seat assembly frame. Moreover, one will appreciate that alternative embodiments may incorporate only sliders, or only rollers. A seat restraining cross beam 34 is provided to prevent seats 22 from separating from sliders 27 in a manner similar to that described above, and thus limits movement of the seats to the arcuate path of their respective guide 28.

Each backrest assembly 25 includes a backrest member 35 extending in a near vertical orientation proximate a respective seat mounting assembly 20, again, in a manner similar to that discussed above. Each backrest member has an upper backrest portion 99 thereof mounted to the respective backrest assembly 25 for movement in a vertically extending direction. Each backrest member also has a lower backrest portion 151 coupled for movement with the respective seat.

Preferably each seat assembly includes a recliner assembly 33. FIGS. 17A and 17B each show the shows the three recliner assemblies setting the respective backrest assemblies 25, 25', 25" at various stages of recline. Backrest assembly 25 is at the most upright position (e.g., a take off and landing position) approximately 16° from vertical. Backrest assembly 25' is at an intermediate angle of recline of approximately 17° to 20°, and backrest assembly 25" is at a fully reclined angle of approximately 31° to 37°. One will appreciate that the actual range of angles may vary in accordance with the present invention.

In operation and use, each seat assembly 21, 21', 21" provides a movable seat and a movable backrest which function in a manner similar to that described above so as to minimize the person's mass acceleration during collisions or other instances of rapid deceleration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A vehicular seat assembly comprising:
   a plurality of seats;
   a plurality of backrest assemblies;
   a plurality of seat mounting assemblies mounting the plurality of seats in a near horizontal orientation for movement along respective upwardly concaved arcuate seat paths having at least one center of curvature adjacent a predetermined center of mass zone above a respective seat below a headrest and forward of a respective backrest assembly; and
   the plurality of backrest assemblies, each including a backrest member extending in a near vertical orientation proximate a respective seat mounting assembly, each backrest member having an upper backrest member portion thereof mounted to the respective backrest assembly for movement in a vertically extending direction and each backrest member having a lower backrest portion coupled for movement with its respective seat;
   a seat assembly frame for mounting the plurality of seat mounting assemblies and the plurality of backrest assemblies to a vehicle; and
   wherein the seat mounting assemblies each include a seat pan having a spherically sliding surface and guide tracks, the guide tracks mated to support surfaces found on seat mounting structures such that the seat mounting assemblies accommodate lateral, diagonal and fore and aft seat motion along said seat path.

2. The vehicular seat assembly as defined in claim 1 wherein,
   the seat assembly frame is configured and dimensioned to mount the vehicular seat assembly in an aircraft cabin.

3. The vehicular seat assembly as defined in claim 1 wherein,
   each backrest assembly includes a recliner frame separate from a respective backrest frame,
   each backrest frame being movably mounted to each respective recliner frame, and a recliner mechanism formed for selective tilting of the respective recliner frame.

4. The vehicular seat assembly as defined in claim 1 wherein,
   each backrest member includes a backrest frame; and
   a lower frame portion of the backrest frame is coupled for movement to its respective seat.

5. The vehicular seat assembly as defined in claim 4 wherein,
   each backrest assembly includes a pair of guide channels positioned inwardly of opposite sides of the respective backrest member.

6. The vehicular seat assembly as defined in claim 4 wherein,
   each backrest frame is pivotally connected to slider members, each backrest assembly includes a pair of guide channels and, the slider members are slidably mounted in the guide channels.

7. The vehicular seat assembly of claim 1 wherein the guide tracks are spherical.

8. The vehicular seat assembly of claim 1 wherein;

the guide tracks are coupled to the seat mounting assembly and, include slider-roller elements such as bearings and roller means positioned between the guide tracks and the spherical support surfaces, to reduce friction below a known threshold.

9. A vehicular seat assembly comprising:

a seat;

a backrest assembly;

a seat mounting assembly mounting the seat in a near horizontal orientation for movement along a upwardly concaved arcuate seat path having at least one center of curvature adjacent a predetermined center of mass zone above the seat below a headrest and forward of the of the backrest assembly; and the backrest assembly including a backrest member extending in a near vertical orientation proximate to the seat mounting assembly, the backrest member having an upper backrest member portion thereof mounted to the backrest assembly for movement in a vertically extending direction and the backrest member having a lower backrest portion coupled for movement with the seat;

a seat assembly frame for mounting the seat mounting assembly and the backrest assembly to a vehicle; and wherein the seat mounting assembly includes a seat pan having a spherically sliding surface and guide tracks, the guide tracks mated to support surfaces found on seat mounting structures such that the seat mounting assembly accommodates lateral, diagonal and fore and aft seat motion, along said seat path.

10. The vehicular seat assembly of claim 9 wherein the guide tracks are spherical.

11. The vehicular seat assembly of claim 9 wherein;

the guide tracks are coupled to the seat mounting assembly and, include slider-roller elements such as bearings and roller means positioned between the guide tracks and the spherical support surfaces, to reduce friction below a known threshold.

12. The vehicular seat assembly as defined in claim 9 wherein, the seat assembly frame is configured and dimensioned to mount the vehicular seat assembly in an aircraft cabin.

13. The vehicular seat assembly as defined in claim 9 wherein, the backrest assembly includes a recliner frame separate from the backrest frame, the backrest frame being movably mounted to the recliner frame, and the recliner mechanism formed for selective tilting of the recliner frame.

14. The vehicular seat assembly as defined in claim 9 wherein, the backrest member includes a backrest frame; and a lower frame portion of the backrest frame is coupled for movement to the seat.

15. The vehicular seat assembly as defined in claim 9 wherein, the backrest assembly includes a pair of guide channels positioned inwardly of opposite sides of the backrest member.

16. The vehicular seat assembly as defined in claim 9 wherein, the backrest frame is pivotally connected to slider members, the backrest assembly includes a pair of guide channels and, the slider members are slidably mounted in the guide channels.

17. The seat assembly as defined in claim 9 wherein, said seat is coupled to the backrest assembly by a seat-femur length and lumbar depth adjustment assembly.

18. The seat assembly as defined in claim 9 wherein, the seat mounting assembly includes a seat locking assembly formed for selective locking and releasing the locked seat.

19. The seat assembly as defined in claim 9, further including, a safety belt restraining harness anchored in a vehicle with at least one of a lap belt, shoulder belt or middle belt.

20. The seat assembly as defined in claim 9 wherein, the seat mounting assembly includes a height adjustment mechanism formed to selectively raise and lower the height at which the seat is supported for arcuate movement.

21. The seat assembly as defined in claim 9 wherein, the seat includes the upwardly concaved seat pan with an anti-submarine member extending transversely across the seat.

22. A method of providing a seat assembly comprising the steps of:

mounting a seat in a near horizontal orientation for movement along an upwardly concaved arcuate seat path;

mounting a backrest in a near vertical orientation proximate to the seat for support of the back of a user while seated on the seat;

coupling a seat pan having a spherically sliding surface and guide tracks, the guide tracks mated to support surfaces found on seat assembly structures such that the seat mounting structures accommodate lateral, diagonal and fore and aft seat motion along said seat path.

23. The method as defined in claim 22 further including:

the step of mounting the backrest is accomplished by mounting the backrest to a recliner frame having a mechanism formed for adjustable positioning of the backrest relative to the seat.

* * * * *